United States Patent
Harel et al.

(10) Patent No.: US 7,792,207 B2
(45) Date of Patent: Sep. 7, 2010

(54) COMMUNICATION DEVICE WITH SMART ANTENNA USING A QUALITY-INDICATION SIGNAL

(75) Inventors: Haim Harel, New York, NY (US); Yingxue Li, Exton, PA (US); Alexander Segalovitz, Kfar-Sava (IL)

(73) Assignee: Magnolia Broadband Inc., Warren, NJ (US)

( * ) Notice: Subject to any disclaimer, the term of this patent is extended or adjusted under 35 U.S.C. 154(b) by 129 days.

(21) Appl. No.: 12/010,655

(22) Filed: Jan. 28, 2008

(65) Prior Publication Data

US 2008/0181328 A1 Jul. 31, 2008

Related U.S. Application Data

(63) Continuation of application No. 11/711,630, filed on Feb. 28, 2007, now Pat. No. 7,327,801, which is a continuation of application No. 10/141,342, filed on May 9, 2002, now Pat. No. 7,321,636.

(60) Provisional application No. 60/294,290, filed on May 31, 2001.

(51) Int. Cl.
*H04B 7/02* (2006.01)
*H04B 7/00* (2006.01)

(52) U.S. Cl. .................. 375/267; 375/141; 375/219; 375/295; 375/299; 455/69; 455/419; 455/420; 455/522; 342/368

(58) Field of Classification Search .......... 375/267, 375/141, 219, 295; 455/69, 419–420, 522; 455/572; 342/368
See application file for complete search history.

(56) References Cited

U.S. PATENT DOCUMENTS

| 5,109,390 A | 4/1992 | Gilhousen et al. |
| 5,577,265 A | 11/1996 | Wheatley, III |
| 5,604,766 A * | 2/1997 | Dohi et al. .................. 375/130 |
| 5,642,353 A | 6/1997 | Roy, III et al. |

(Continued)

FOREIGN PATENT DOCUMENTS

EP 0 986 193 3/2000

(Continued)

OTHER PUBLICATIONS

Derryberry et al., "Transmit Diversity in 3G CDMA Systems", Wideband Wireless Access Technologies to Broadband Internet, IEEE Communications Magazine, Apr. 2002, pp. 68-75.

(Continued)

*Primary Examiner*—Mohammad H Ghayour
*Assistant Examiner*—Sophia Vlahos
(74) *Attorney, Agent, or Firm*—Pearl Cohen Zedek Latzer, LLP

(57) ABSTRACT

A mobile communication device may transmit a signal using a plurality of antenna elements, the signals differing by a transmit diversity parameter, e.g., a phase difference. The mobile communication device may receive a quality-indication signal from a basestation, e.g., a power control bit or signal. A sequence of the power control bits or signals may be used to provide feedback to the mobile communication device to determine a change in a transmit diversity parameter.

46 Claims, 13 Drawing Sheets

U.S. PATENT DOCUMENTS

| | | | |
|---|---|---|---|
| 5,771,022 A | 6/1998 | Vaughan et al. | |
| 5,781,845 A | 7/1998 | Dybdal et al. | |
| 5,832,044 A | 11/1998 | Sousa et al. | |
| 5,832,387 A | 11/1998 | Bae et al. | |
| 5,867,478 A | 2/1999 | Baum et al. | |
| 5,960,039 A | 9/1999 | Martin et al. | |
| 5,982,327 A | 11/1999 | Vook et al. | |
| 5,991,330 A | 11/1999 | Dahlman et al. | |
| 5,999,826 A * | 12/1999 | Whinnett | 455/561 |
| 6,104,983 A | 8/2000 | Nakada | |
| 6,137,840 A | 10/2000 | Tiedemann, Jr. et al. | |
| 6,141,567 A | 10/2000 | Youssefmir et al. | |
| 6,167,039 A | 12/2000 | Karlsson et al. | |
| 6,167,286 A | 12/2000 | Ward et al. | |
| 6,185,440 B1 | 2/2001 | Barratt et al. | |
| 6,195,342 B1 | 2/2001 | Rohani | |
| 6,226,509 B1 | 5/2001 | Mole et al. | |
| 6,236,363 B1 | 5/2001 | Robbins et al. | |
| 6,236,839 B1 | 5/2001 | Gu et al. | |
| 6,259,683 B1 | 7/2001 | Sekine et al. | |
| 6,266,528 B1 | 7/2001 | Farzaneh | |
| 6,304,215 B1 | 10/2001 | Proctor, Jr. et al. | |
| 6,307,506 B1 | 10/2001 | Despain | |
| 6,317,411 B1 | 11/2001 | Whinnett et al. | |
| 6,317,587 B1 | 11/2001 | Tiedemann, Jr. et al. | |
| 6,330,294 B1 | 12/2001 | Ansbro et al. | |
| 6,343,218 B1 * | 1/2002 | Kaneda et al. | 455/522 |
| 6,349,218 B1 | 2/2002 | Nakagawa et al. | |
| 6,351,499 B1 | 2/2002 | Paulraj et al. | |
| 6,362,781 B1 | 3/2002 | Thomas et al. | |
| 6,369,758 B1 | 4/2002 | Zhang | |
| 6,392,988 B1 | 5/2002 | Allpress et al. | |
| 6,492,942 B1 | 12/2002 | Kezys | |
| 6,594,473 B1 | 7/2003 | Dabak et al. | |
| 6,636,495 B1 * | 10/2003 | Tangemann | 370/334 |
| 6,704,370 B1 | 3/2004 | Chheda et al. | |
| 6,745,009 B2 | 6/2004 | Raghothaman | |
| 6,748,024 B2 | 6/2004 | Kuchi et al. | |
| 6,782,037 B1 | 8/2004 | Krishnamoorthy et al. | |
| 6,810,264 B1 | 10/2004 | Park et al. | |
| 6,816,557 B2 | 11/2004 | Kuchi et al. | |
| 6,859,643 B1 | 2/2005 | Ma et al. | |
| 6,882,228 B2 | 4/2005 | Rofougaran | |
| 2001/0005685 A1 | 6/2001 | Nishimori et al. | |
| 2001/0020915 A1 | 9/2001 | Proctor, Jr. | |
| 2001/0022557 A1 | 9/2001 | Rouphael et al. | |
| 2002/0008672 A1 | 1/2002 | Gothard et al. | |
| 2002/0021683 A1 | 2/2002 | Holtzman et al. | |
| 2002/0058510 A1 | 5/2002 | Mohebbi | |
| 2002/0098872 A1 * | 7/2002 | Judson | 455/562 |
| 2002/0122465 A1 | 9/2002 | Agee et al. | |
| 2002/0145968 A1 | 10/2002 | Zhang et al. | |
| 2003/0026219 A1 | 2/2003 | Moon et al. | |
| 2003/0112880 A1 | 6/2003 | Walton et al. | |
| 2004/0048584 A1 | 3/2004 | Vaidyanathan et al. | |
| 2004/0066754 A1 | 4/2004 | Hottinen | |
| 2004/0085239 A1 | 5/2004 | Ukena et al. | |
| 2005/0059355 A1 | 3/2005 | Liu | |
| 2005/0083875 A1 | 4/2005 | Sato | |
| 2005/0143113 A1 | 6/2005 | Lee et al. | |

FOREIGN PATENT DOCUMENTS

| | | | |
|---|---|---|---|
| EP | 0 999 658 | | 7/2000 |
| EP | 1 204 217 | | 5/2002 |
| EP | 1 255 369 | | 11/2002 |
| EP | 1 282 242 | | 2/2003 |
| EP | 1 282 244 | | 2/2003 |
| EP | 1 284 545 | | 2/2003 |
| EP | 1 262 031 | | 5/2004 |
| GB | 2 353 437 | * | 2/2001 |
| JP | 09-238098 | | 9/1997 |
| JP | 2000-151484 | | 5/2000 |
| WO | WO 97/24818 | | 7/1997 |
| WO | WO 00/36764 | | 6/2000 |
| WO | WO 00/79701 | | 12/2000 |
| WO | WO 01/69814 | | 9/2001 |
| WO | WO 02/13493 | | 2/2002 |
| WO | WO 03/005606 | | 1/2003 |
| WO | WO 03/073648 | | 9/2003 |
| WO | WO 03/090386 | | 10/2003 |
| WO | WO 2004/045108 | | 5/2004 |
| WO | WO 2005/081444 | | 9/2005 |

OTHER PUBLICATIONS

Rashid-Farrokhi, et al., "Transmit Beamforming and Power Control for Cellular Wireless Systems", IEEE Journal on Selected Areas in Communications, vol. 16, No. 8, Oct. 1998, pp. 1437-1450.

Supplementary Partial European Search Report for Application No. 02 72 5954 dated Sep. 9, 2004.

Japanese Office Action of Application No. 2003-501851 dated Mar. 14, 2007.

International Search Report of Application No. PCT/US2002/014437 dated Oct. 29, 2002.

International Search Report of Application No. PCT/US2006/039400 dated Feb. 2, 2007.

http://www.efunda.com/math/complex_numbers/complex.cfm.

International Search Report of Application No. PCT/US2002/012978 dated Jul. 23, 2002.

* cited by examiner

COMMUNICATION DEVICE WITH SMART ANTENNA USING A QUALITY-INDICATION SIGNAL

CROSS-REFERENCE TO RELATED APPLICATIONS

This application is a continuation of U.S. patent application Ser. No. 11/711,630, filed Feb. 28, 2007 now U.S. Pat. No. 7,327,801, which is a continuation of U.S. patent application Ser. No. 10/141,342, filed May 9, 2002 now U.S. Pat. No. 7,321,636, which in turn claims priority from U.S. Provisional Patent Application No. 60/294,290, entitled "Smart Antennae: Using Standard Power Control Signaling On Cellular Systems For Smart Antenna Control within Cell Phone", filed May 31, 2001, the entirety of which are incorporated herein by reference. This application is also related to U.S. patent application Ser. No. 10/082,351, entitled "Smart Antenna Based Spectrum Multiplexing Using a Pilot Signal", filed Feb. 26, 2002, the entirety of which is incorporated herein by reference.

BACKGROUND

The invention relates generally to communications and more particularly to a system and method for using a quality-indication signal added to a transmitted signal in a communication system, and used by the receiving end, in conjunction with multiple antenna elements. The receiver can use a separation process known as spatial filtering, or also referred to herein as smart antenna.

Broadband networks having multiple information channels are subject to certain types of typical problems such as inter-channel interference, a limited bandwidth per information channel, inter-cell interference that limit the maximum number of serviceable users, and other interference. The usage of smart antenna techniques (e.g., using multiple antenna elements for a separation process known as spatial filtering), at both ends of the wireless communications channels, can enhance spectral efficiency, allowing for more users to be served simultaneously over a given frequency band Power-control signaling is another technique used to minimize inter-channel interference and increase network capacity. For example, mobile communication standards include a high rate, continuous, power-control signaling to ensure that mobile communication devices do not transmit too much or too little power. More specifically, based on the strength of the signal sent from the communication device and received at the basestation, the basestation sends a power-control signal to the mobile communication device indicating whether the communication device should increase or decrease the total power of its transmitted signal. The transmission rates for each value of the power-control signals are, for example, 1.25 ms for cdmaOne (IS-95)/CDMA2000, and 0.66 ms for WCDMA.

The known uses of power-control signaling have been limited only to adjusting the total power of the signal transmitted from the communication device. Next generation communication devices, however, can use multiple antenna elements (also referred to herein as a "smart antenna") for a separation process known as spatial filtering. Thus, a need exists for an improved system and method that can combine the advantages of power-control signaling with the advantages of smart antennas.

SUMMARY OF THE INVENTION

Communication is performed for a first communication device having a set of antenna elements. A quality-indication signal is received from a second communication device (e.g., a basestation). A complex weighting is calculated based on the quality-indication signal. A modulated pre-transmission signal is modified based on the complex weighting to produce a set of modified pre-transmission signals. Each modified pre-transmission signal from the set of modified-pre-transmission signals is uniquely associated with an antenna element from the set of antenna elements. The set of modified pre-transmission signals is sent from the set of antenna elements to produce a transmitted signal. The complex weighting is associated with total power of the transmitted signal and at least one from a phase rotation and a power ratio associated with each antenna element from the set of antenna elements.

DETAILED DESCRIPTION

Figure 1:
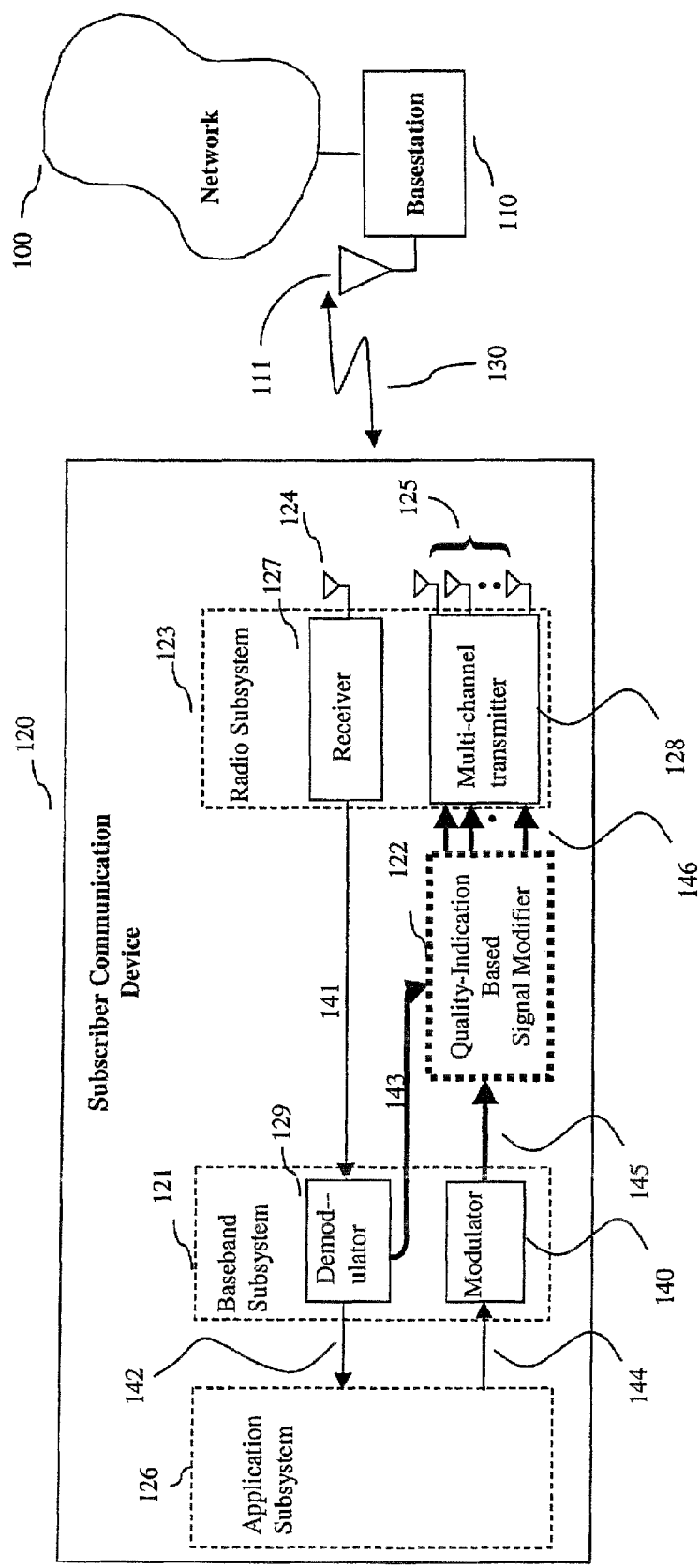
FIG. 1 shows a system block diagram of a communication network according to an embodiment of the invention.

A transmitted signal sent from a subscriber communication device to a second communication device (e.g., a basestation)

can be weakened by time or by propagation-geometry-dependent fading and multipath. In other words, a signal sent from a subscriber communication device to a basestation will undergo destructive interference due to the fact that the transmitted signal propagates along different paths and reaches the basestation as a combination of the signals each having a different phase.

Accordingly, by controlling the phase of the transmitted signal at the subscriber communication device, the combination of signals received at the basestation can constructively interfere rather than destructively interfere, or alternatively reduce the intensity of the destructive interference. The phase of the transmitted signal can be controlled through the use of multiple antenna elements at the subscriber communication device. If the rate at which the transmitted signal is controlled exceeds the rate of fading, then the basestation will receive the transmitted signal at a relatively constant rate of power at a substantially optimized power. Because the rate of fading is relatively slow (e.g., between few Hz and a couple of hundred Hz) compared to the rate of power-control signaling in certain known communication protocols (e.g., around 1000s of Hz), power-control signaling can be used to tune a smart antenna to substantially optimize the transmission of signals from a subscriber communication device to a basestation.

The tuning of the subscriber communication device is done through the use of complex weighting. The signals associated with each antenna element from a set of multiple antenna elements can be adjusted based on the complex weighting. The term "complex weighting" relates to real and imaginary components of a signal, which can be varied to define the magnitude and phase of the signal. Because each of these signals can be adjusted differently, each signal is a low-correlation version of the pre-transmission signal upon which the transmitted signal is based. In other words, the signals associated with each antenna element can be adjusted separately from each other based on the complex weighting so that these signals are a low-correlation version of the pre-transmission signal. The complex weighting is calculated to adjust the total power of the transmitted signal and the phase rotation and/or power ratio associated with each antenna element.

Note that term "quality-indication signal" is used herein to mean a signal having information about the quality of the communication link between a communication source sending the signal with multiple antenna elements and a communication device receiving the signal. For example, the quality-indication signal can be a power-control signal according to a code-division multiple access (CDMA) protocol. Such a CDMA protocol can be, for example, CDMA-IS-95 A/B, CDMA 2000 1X/RTT, CDMA 2000 3X, CDMA EV-DO, wideband CDMA (WCDMA), third-generation (3G) Universal Mobile Telecommunications System (UMTS) and fourth-generation (4G) UMTS. In fact, although the embodiments described herein are often in reference to such a power-control signal, any type of quality-indication signal in accordance with any type of communication protocol can be appropriate.

In addition, although the embodiments described herein are in reference to a basestation sending a quality-indication signal to a subscriber communication device having multiple antenna elements, alternative embodiments are possible. For example, in alternative embodiments, a quality-indication signal can be sent from a subscriber communication device to a basestation having multiple antenna elements. Alternatively, a quality-indication signal can be sent from one communication device to another communication device having multiple antenna elements.

FIG. 1 shows a system block diagram of a wireless communication network according to an embodiment of the invention. As shown in FIG. 1, network 100 is coupled to basestation 110, which includes antenna 111. Subscriber communication device 120 is coupled to basestation 110 by, for example, a wireless communication link 130. Subscriber communication device 120 includes baseband subsystem 121, quality-indication based signal modifier 122, radio subsystem 123, receive antenna 124, array of transmit antennas 125, and application subsystem 126, which handles the voice/data/display/keyboard, etc. The baseband subsystem 121 comprises two main portions: a modulator 140 and a demodulator 129. The radio subsystem 123 comprises two main portions: a receiver 127 and a multi-channel transmitter 128.

Baseband subsystem 121, quality-indication based signal modifier 122, the multi-channel transmitter 128, and transmit antenna array 125 are portions of a transmitter for subscriber communication device 120.

Baseband subsystem 121 is the portion of the wireless communications system that receives a modulated received signal 141, demodulates it to produce demodulated received signal 142 and to extract the quality indicator sent from the other side of the wireless link 130. Demodulated received signal 142 is provided to application subsystem 126. The extracted quality indicator is fed into the quality-indication based signal modifier 122 via quality-indication signal 143. Quality-indication based signal modifier 122 modifies the pre-transmission signal 145 in such a way that the other side of the wireless link 130 (e.g., basestation 110), undergoes improved reception without necessarily increasing the combined power level transmitted from the subscriber communication device 120. Rather, by manipulating the weights of the various power amplifiers that feed their respective antenna elements in the array of transmit antennas 125, better multipath behavior is achieved at the other side of the wireless link 130 (e.g., at basestation 110), as explained in further detail below. Said another way, application subsystem 126 receives information for transmission such as, for example, data and/or voice information. Application subsystem 126 sends an unmodulated transmission signal 144 to modulator 140 of baseband subsystem 121. Modulator 140 modulates unmodulated transmission signal 144 to produce pre-transmission signal 145, which is provided to quality-indication signal modifier 122. Quality-indication signal modifier calculates a complex weighting based on the quality-indication signal 143 and modifies the pre-transmission signal to produce a plurality of modified pre-transmission signals 146. Each modified pre-transmission signal is uniquely associated with an antenna element from the array of transmit antennas 145. The modified pre-transmission signal 146 is sent to multi-channel transmitter 128, which forwards the modified pre-transmission signals 146 to the array of transmit antennas 125. The array of transmit antennas 125 sends an effective combined transmitted signal based on the modified pre-transmission signal 146.

Figure 2:
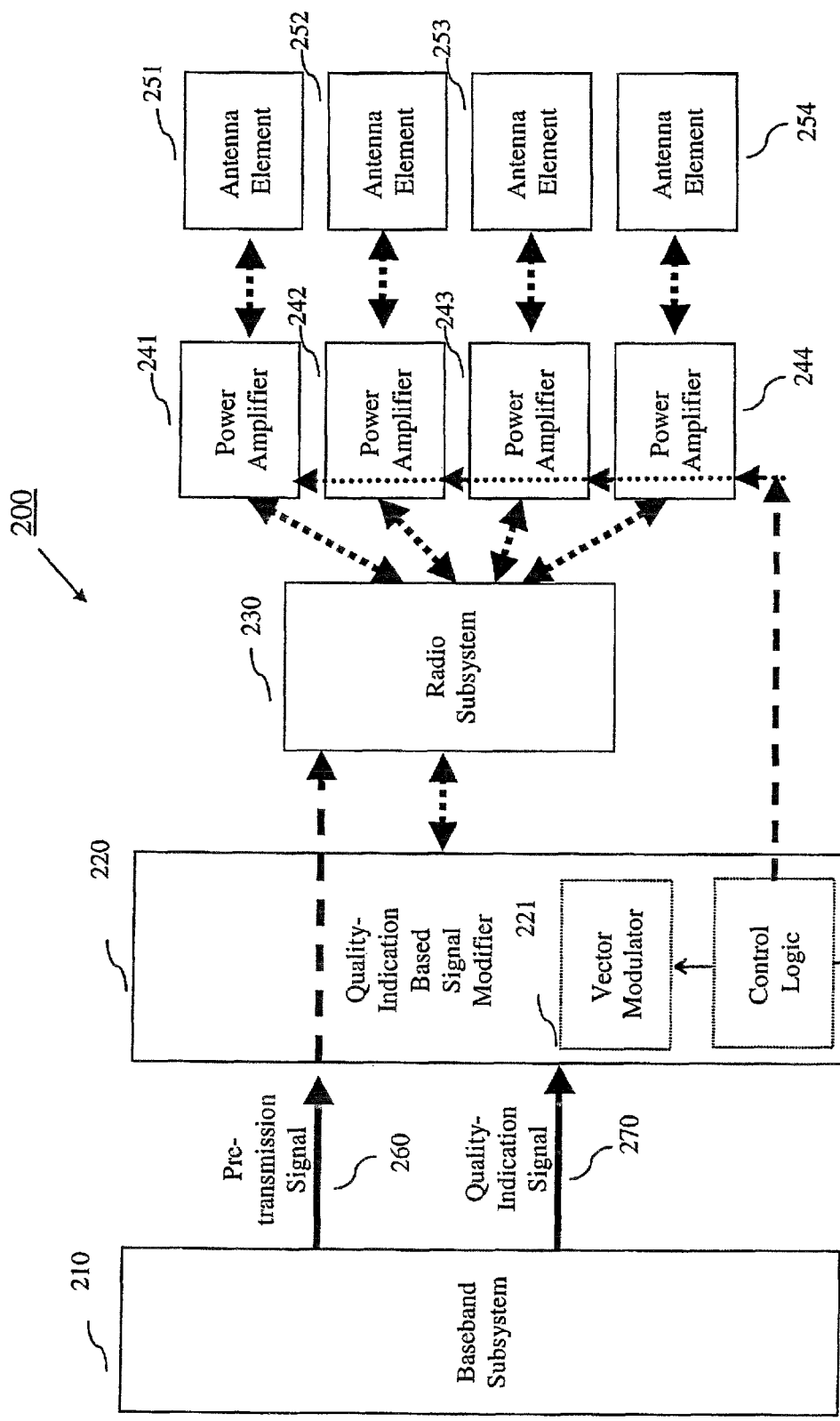
FIG. 2 shows a system block diagram of a transmitter for the subscriber communication device shown in FIG. 1.

FIG. 2 shows a system block diagram of a transmitter for the subscriber communication device shown in FIG. 1. The transmitter system 200 includes baseband subsystem 210, quality-indication based signal modifier 220, radio subsystem 230, power amplifiers 241, 242, 243 and 244, and antenna elements 251, 252, 253 and 254. Baseband subsystem 210, quality-indication based signal modifier 220, radio subsystem 230, antenna elements 251, 252, 253 and 254, correspond to baseband subsystem 121, quality-indication based signal modifier 122, radio subsystem 123, and transmit antenna array 125, shown in FIG. 1.

Note that although the subscriber communication device is shown FIG. 2 as having four antenna elements 251 through 254 and four corresponding power amplifiers 241 and 244, any number of two or more antenna elements (and corresponding power amplifiers) is possible. Thus, it will be understood that although the subscriber communication device is described herein as having four antenna elements, other embodiments can have any number of two or more antenna elements.

Baseband subsystem 210 is coupled to quality-indication based signal modifier 220 and sends a pre-transmission signal 260 and a quality-indication signal 270. Quality-indication based signal modifier 220 includes vector modulator 221 and control logic 222. Quality-indication signal modifier 220 is coupled to radio subsystem 230 and power amplifiers 241 through 244. More specifically, quality-indication based signal modifier 220 provides modified pre-transmission signals to radio subsystem 230. Control logic 222 of quality-indication based signal modifier 220 provides complex weighting to vector modulator 221 and power amplifiers 241 through 244, as described below in further detail.

Radio subsystem 230 receives the modified pre-transmission signal from quality-indication based signal modifier 220. The modified pre-transmission signal can be, for example either baseband signals, IF signals, or RF signals. Radio subsystem 230 converts the received pre-transmission signal into radio frequency (RF) signals, which are provided to power amplifiers 241 through 244.

Power amplifiers 241 through 244 each receive RF modified pre-transmission signals and amplify those signals for transmission. Power amplifiers 241 through 244 are coupled to antenna elements 251 through 254, respectively. Power amplifiers 241 through 244 provide the amplified signals to antenna elements 251 through 254, each of which sends its respective RF modified pre-transmission signal to produce a transmitted signal. In other words, each antenna element 251 through 254 sends a respective signal component all of which form a transmitted signal.

Figure 3:
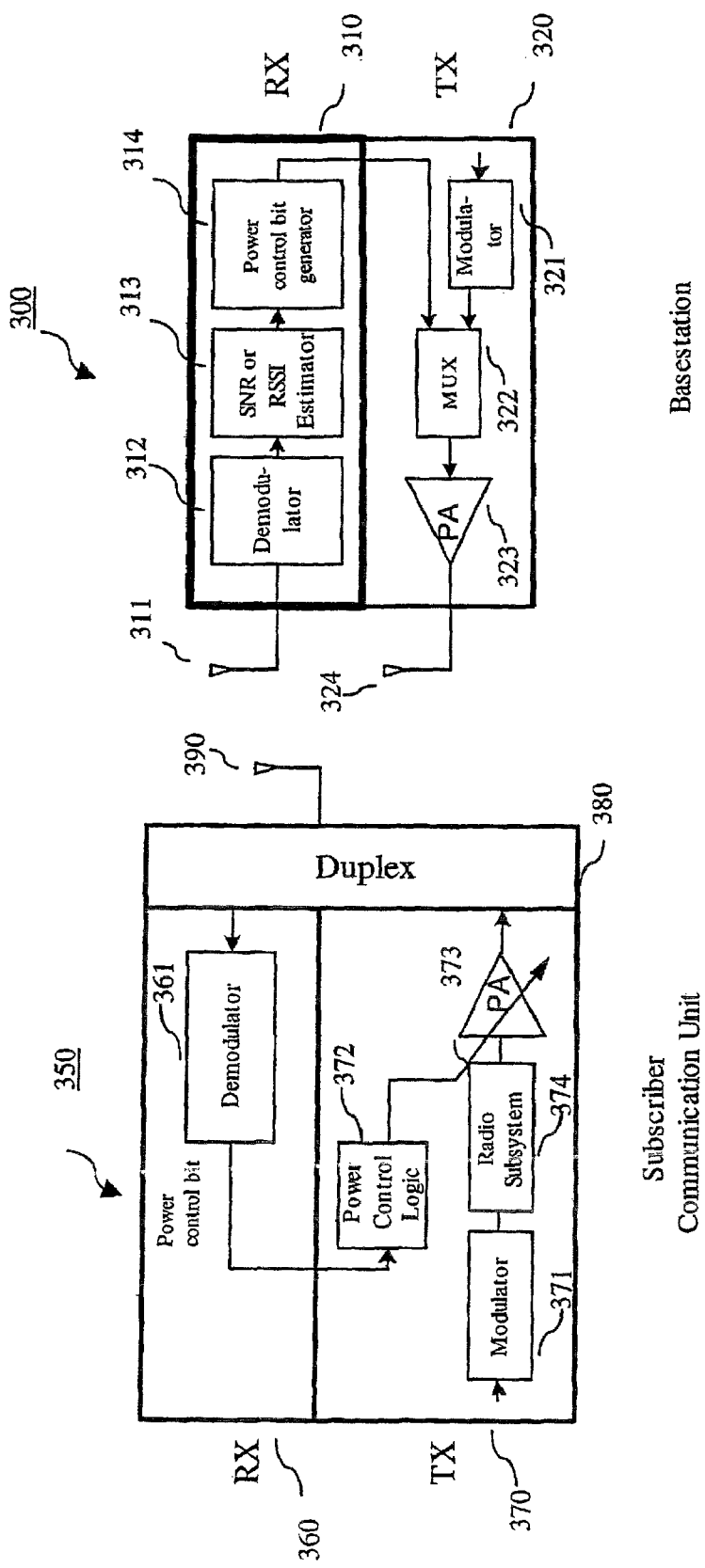
FIG. 3 shows a system block diagram of a basestation and subscriber communication device according to a known system.

FIG. 3 shows a system block diagram of a basestation and subscriber communication device according to a known system. This is helpful for understanding how prior CDMA basestation systems employ a power-control signal to adjust the transmit power of the subscriber communication device.

In FIG. 3, basestation 300 includes receiver (Rx) 310 and transmitter (Tx) 320. Receiver 310 includes demodulator 312, signal-to-noise ratio (SNR) or RSSI (RF Signal Strength Indicator) estimator 313 and power control bit generator 314. Receiver 310 is coupled to antenna 311. Transmitter 320 includes modulator 321, multiplexer 322 and power amplifier (PA) 323. Transmitter 320 is coupled to antenna 324.

Subscriber communication unit 350 includes receiver 360, transmitter 370, duplexer/diplexer 380 and antenna 390. Duplexer/diplexer 380 can comprise a filter separating different bands like cellular service versus Personal Communication Service (PCS), and/or separation of receive/transmit; typically, duplexer/diplexer 380 has one port connected to one antenna, and other port connected to various radio circuitries that operate either simultaneously or alternatively. Receiver 360 includes demodulator 361. Transmitter 370 includes modulator 371, power control logic 372, power amplifier (PA) 373 and radio subsystem 374.

Antenna 311 at the basestation receiver 310 is coupled to demodulator 312, which is in turn coupled to SNR or RSSI estimator 313. SNR or RSSI estimator 313 is coupled to power control bit generator 314, which is in turn coupled to multiplexer 322. Multiplexer 322 is also coupled to modulator 321 and power amplifier (PA) 323, which is in turn coupled to antenna 324.

Antenna 390 at the receiver 360 of subscriber communication device 350 is coupled to duplexer/diplexer 380. Duplexer/diplexer 380 relays received signals from antenna 390 to receiver 360 and relays signals sent from transmitter 370 to antenna 390. More specifically, duplexer/diplexer 380 is coupled to demodulator 361, which is coupled to power control logic 372.

Turning to the transmitter 370, modulator 371 receives the pre-transmission signal for transmission and provides it to radio subsystem 374. Radio subsystem 374 converts the pre-transmission signal into a RF signals, and forwards it to power amplifier 373. Power amplifier 373 is also coupled to power-control logic 372, which provides power-control information. More specifically, the received signals include a quality-indication signal such as, for example, a power-control signal having one or more power-control bits. These power-control bits indicate the manner in which the subscriber communication device should modify the total power of the transmitted signal. The power control indication is originally generated at the other side of the wireless communications link (e.g., basestation 300), and is sent back to the subscriber communication unit 350 to obtain improved signal quality in such a way that will produce reduced interference. These power-control bits are provided to power amplifier 373, which adjusts the total power for the transmitted signal based on the power-control bits. Power amplifier 373 is coupled to duplexer/diplexer 380, which forwards the amplified pre-transmission signal to antenna element 390 for transmission.

Note that in the known subscriber communication device 350, the power control logic 372 provides information based on the received power control bit to power amplifier 373. The only adjustment to the transmit signal is an adjustment to the power amplifier output level.

Figure 4:
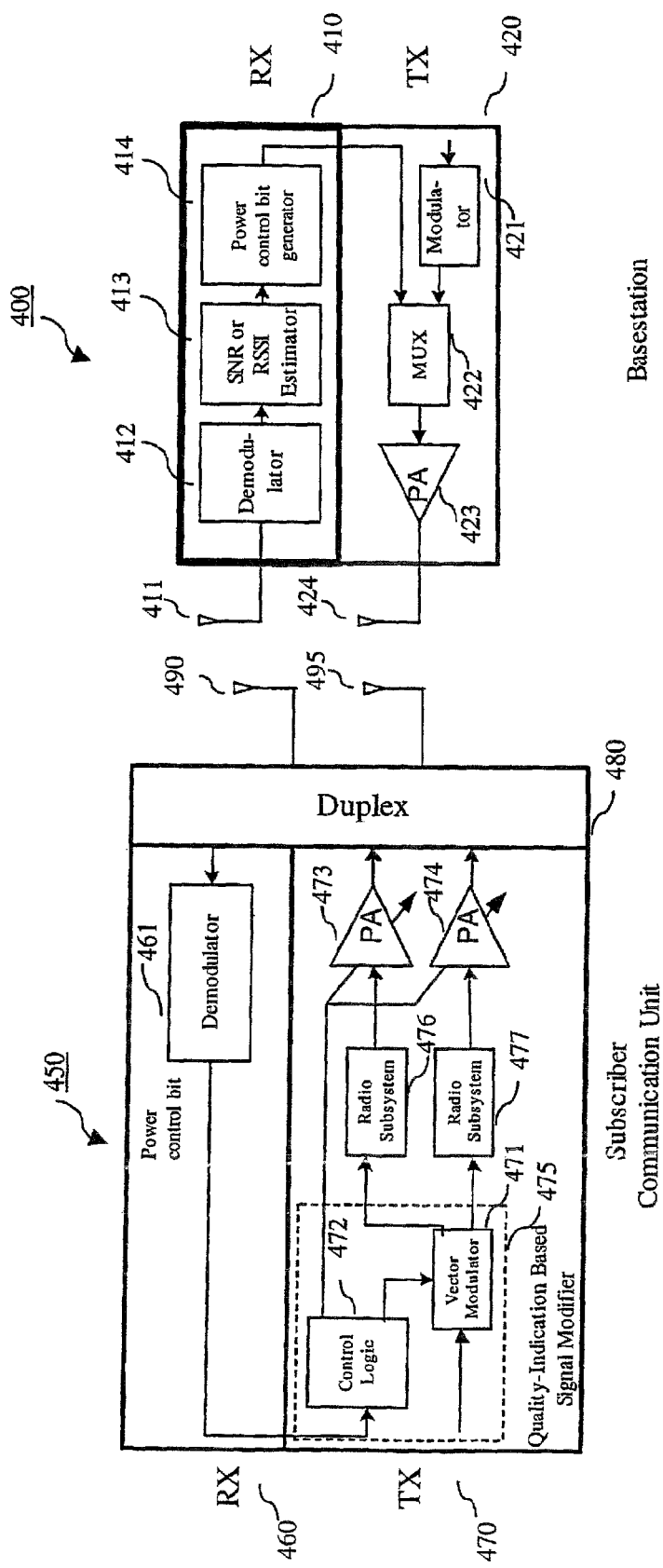
FIG. 4 shows a system block diagram of a basestation and a subscriber communication device having two transmitting antennas, according to an embodiment of the invention.

FIG. 4 shows a system block diagram of a basestation and subscriber communication device according to an embodiment of the invention. Basestation 400 includes a receiver (Rx) 410 and transmitter (Tx) 420. Receiver 410 includes antenna 411, demodulator 412, SNR or RSSI estimator 413 and power control bit generator 414. Transmitter 420 includes modulator 421, multiplexer 422, power amplifier (PA) 423 and antenna 424.

Subscriber communication unit 450 includes receiver 460, transmitter (Tx) 470, dual duplexer/diplexer 480 and antennas 490 and 495. Dual duplexer/diplexer 480 is, for example, a set of two units, each comprising a duplexer/diplexer. Receiver 460 includes demodulator 461. Transmitter 470 includes quality-indication based signal modifier 475, which includes vector modulator 471 and power control logic 472. Transmitter 470 also includes radio subsystems 476 and 477, and power amplifiers 473 and 474.

Antenna 411 at the basestation receiver 410 is coupled to demodulator 412, which is in turn coupled to SNR estimator 413. SNR or RSSI estimator 413 is coupled to power control bit generator 414, which is in turn coupled to multiplexer 422. Multiplexer 422 is also coupled to modulator 421 and power amplifier 423, which is in turn coupled to antenna 424.

Subscriber communication unit 450 includes antennas 490 and 495 that are used for both reception and transmission, and are coupled to dual duplexer/diplexer 480. Dual duplexer/diplexer 480 is coupled to receiver 460 and transmitter 470. Note that for the purpose of this embodiment, the receiver may use only one of the two antennas 490 and 495, or a combination of them. Receiver 460 includes demodulator 461, which is coupled to control logic 472 of quality-indication based signal modifier 475. Control logic 472 is coupled to vector modulator 471 of quality-indication based signal modifier 475. Vector modulator 471 is coupled to radio subsystems 476 and 477, which are coupled to power amplifiers 473 and 474, respectively. Power amplifiers 473 and 474 are also coupled to control logic 472. In addition, power amplifiers 473 and 474 are coupled to antenna elements 490 and 495, respectively, through dual duplexer/diplexer 480.

Demodulator 461 receives signals from antennas 490 and 495 via the dual duplexer/diplexer 480 to produce a quality-indication signal. This quality-indication signal can be, for example, a power-control signal having one or more power-control bits. This quality-indication signal is provided to control logic 472. Note that demodulator 461 performs other functions and produces other signals, which are not shown in FIG. 4 for the purpose of clarity in the figure. Control logic 472 produces complex weighting values and forwards these complex weighting values to vector modulator 471 and power amplifiers 473 and 474. Power amplifier 473 is associated with antenna element 490 and power amplifier 474 is associated with antenna element 495.

Note that the control logic 472 is different from the power control logic 372 of the known subscriber communication device 350 shown in FIG. 3. The power control logic 372 merely provided power control information to power amplifier 373, whereas the control logic 472 shown in FIG. 4 provides complex weighting to both the vector modulator 471 and the set of power amplifiers 473 and 474. This allows not only the total power of the transmitted signal to be adjusted based on the received power-control bit, but in addition, allows the phase rotation and/or the power ratio associated with each antenna element 490 and 495 to be adjusted based on the received power control information. Accordingly, this allows the transmitted signal to be optimal with respect to its reception by basestation 400. Once this optimized signal is received by basestation 400, basestation 400 can then send a power-control signal to subscriber communication device 450 indicating that subscriber communication 450 should adjust the total power of its transmitted signal. Consequently, by optimizing the transmitted signal, the total power of the transmitted signal can be reduced, versus the case of a communication device with a single antenna, as described in FIG. 3. Such an optimization beneficially allows, for example, an increase in the battery lifetime of subscriber communication unit 450, an increase in the cellular system capacity of the communication network, and a decrease in the radiation hazard to the user of the subscriber communication unit 450.

The complex weighting provided by control logic 472 can be based on the total power of the transmitted signal and one or both of the phase rotation and the power ratio associated with each antenna element 490 and 495.

Figure 5:
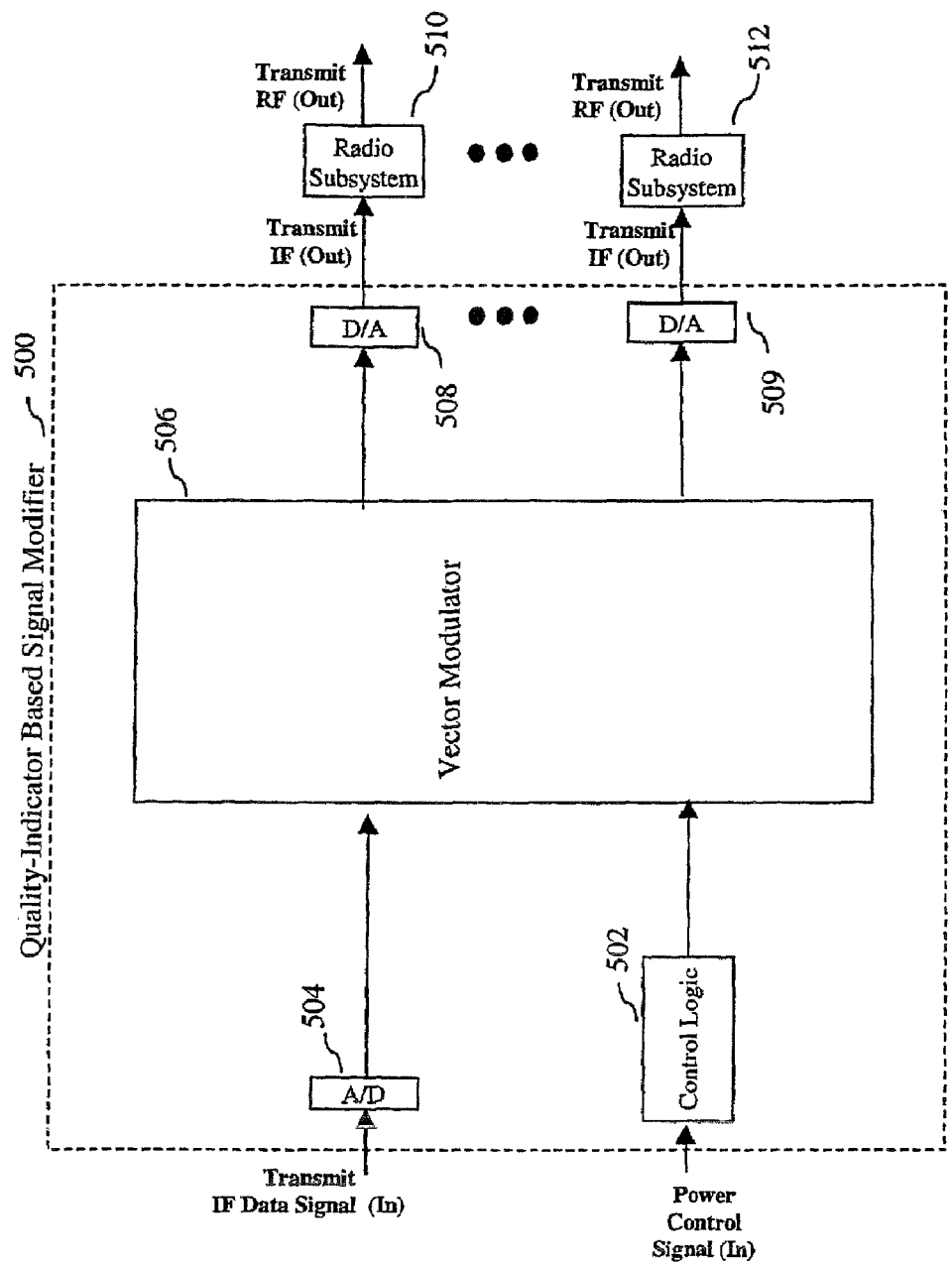
FIG. 5 illustrations a portion of the transmitter system for subscriber communication device, according to another embodiment of the invention.

FIG. 5 illustrates a portion of the transmitter system for subscriber communication device, according to another embodiment of the invention. Quality-indicator based signal modifier 500 includes control logic 502, analog-to-digital (A/D) converter 504, vector modulator 506 and digital-to-analog (D/A) converters 508 through 509. D/A converter 508 is coupled to radio subsystem 510 and D/A converter 509 is coupled to radio subsystem 512.

Note that the D/A converters and radio subsystems are repeated for a number that corresponds to the number of antenna elements. In other words, if subscriber communication device has N number of antenna elements, then the subscriber communication device has N number of D/A converters and radio subsystems. Thus, as shown in FIG. 5, D/A converter 508 and radio subsystem 510 are associated with one antenna element from a set of antenna elements (not shown in FIG. 5). D/A converter 509 and radio subsystem 512 are associated with a different antenna element from the set of antenna elements. Any remaining antenna elements from the set of antenna elements are each also uniquely associated with a D/A converter and a radio subsystem.

The quality-indicator based signal modifier 500 receives an IF pre-transmission signal and power-control signal. The IF pre-transmission signal is received by A/D converter 504, which converts the analog pre-transmission signal to a digital form. The A/D converter 504 forwards the digital pre-transmission signal to vector modulator 506. The power control signal is received by control logic 502, which determines complex weighting values.

The complex weighting is calculated by determining the appropriate weighting value associated with the in-phase signal component and the quadrature signal component associated with each antenna element. For example, in the case where the phase rotation is being adjusted, the weighting value for the in-phase signal component will be different than the weighting value for the quadrature signal component. In the case where the power ratio is being adjusted, the weighting value for the in-phase signal component and the weighting value for the quadrature signal component are simultaneously increased or decreased for a given antenna element in parallel. Finally, in the case where the total power of the transmitted signal is being adjusted, the weighting value for the in-phase signal component and the weighting value for the quadrature signal component are simultaneously increased or decreased for all of the antenna elements in parallel.

Control logic 502 provides the complex weighting values to vector modulator 506. Vector modulator 506 receives the digital pre-transmission signal from A/D converter 504 and the complex weighting values from control logic 502. Vector modulator 506 splits the pre-transmission signal into a number of pre-transmission signals corresponding to the number of antenna elements. The vector modulator 506 then applies the complex weighting to the various pre-transmission signals so that each pre-transmission signal, which uniquely corresponds to an antenna element, modifies the respective pre-transmission signal based on the complex weighting values. The modified pre-transmission signals are then provided to D/A converters 508 through 509, which convert the pre-transmission signal from digital to analog form. Those pre-transmission signals are then provided to radio subsystems 510 through 512, respectively, which then convert the IF form of the pre-transmission signals into an RF form. These signals are then forwarded to power amplifiers and respective antenna elements (not shown in FIG. 5).

Figure 6:
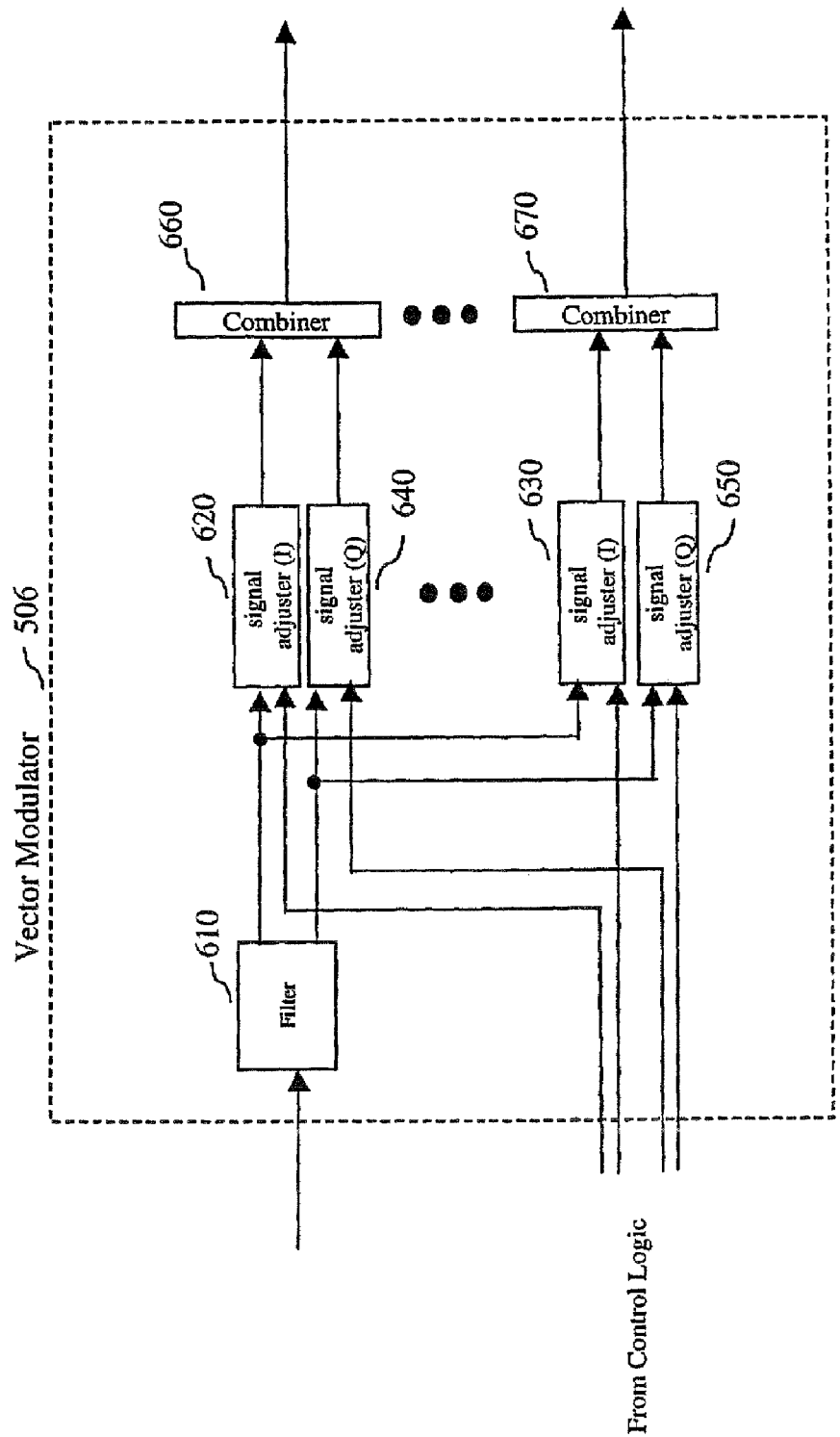
FIG. 6 shows an example of a system block diagram of the vector modulator, according to an embodiment of the invention.

FIG. 6 shows a system block diagram of the vector modulator shown in FIG. 5. Vector modulator 506 includes filter 610, in-phase signal adjusters 620 through 630, quadrature signal adjusters 640 through 650, and combiners 660 through 670.

The in-phase signal adjuster 620, the quadrature signal adjustor 640 and the combiner 660 are all uniquely associated with an antenna element from the set of antenna elements (not shown in FIG. 6). This set of components is repeated within vector modulator 506 corresponding to the number of remaining antenna elements for the subscriber communication device. Thus, as shown in FIG. 6, in-phase signal adjuster 630, quadrature signal adjuster 650 and combiner 670 are also shown for another antenna element of the subscriber communication device.

Filter 610 receives the digital pre-transmission signal from A/D converter 504. Filter 610 divides the received pre-transmission signal into in-phase and quadrature components. The in-phase component of the pre-transmission signal is provided to in-phase signal adjusters 620 through 630. The quadrature component of the pre-transmission signal is provided to quadrature signal adjusters 640 through 650. In-phase signal adjusters 620 through 630 and quadrature signal adjusters 640 through 650 receive complex weighting values from control logic 502. In-phase signal adjusters 620 through 630 and quadrature signal adjusters 640 through 650 apply the complex weighting to the pre-transmission signal components to produce modified pre-transmission signals. In-phase signal adjusters 620 through 630 and quadrature signal adjusters 640 through 650 provide modified pre-transmission signals to combiners 660 and 670, respectively. Combiners 660 and 670 then add the respective modified pre-transmission signals and forward the added signals to D/A converters 508 and 509, respectively.

Figure 7:
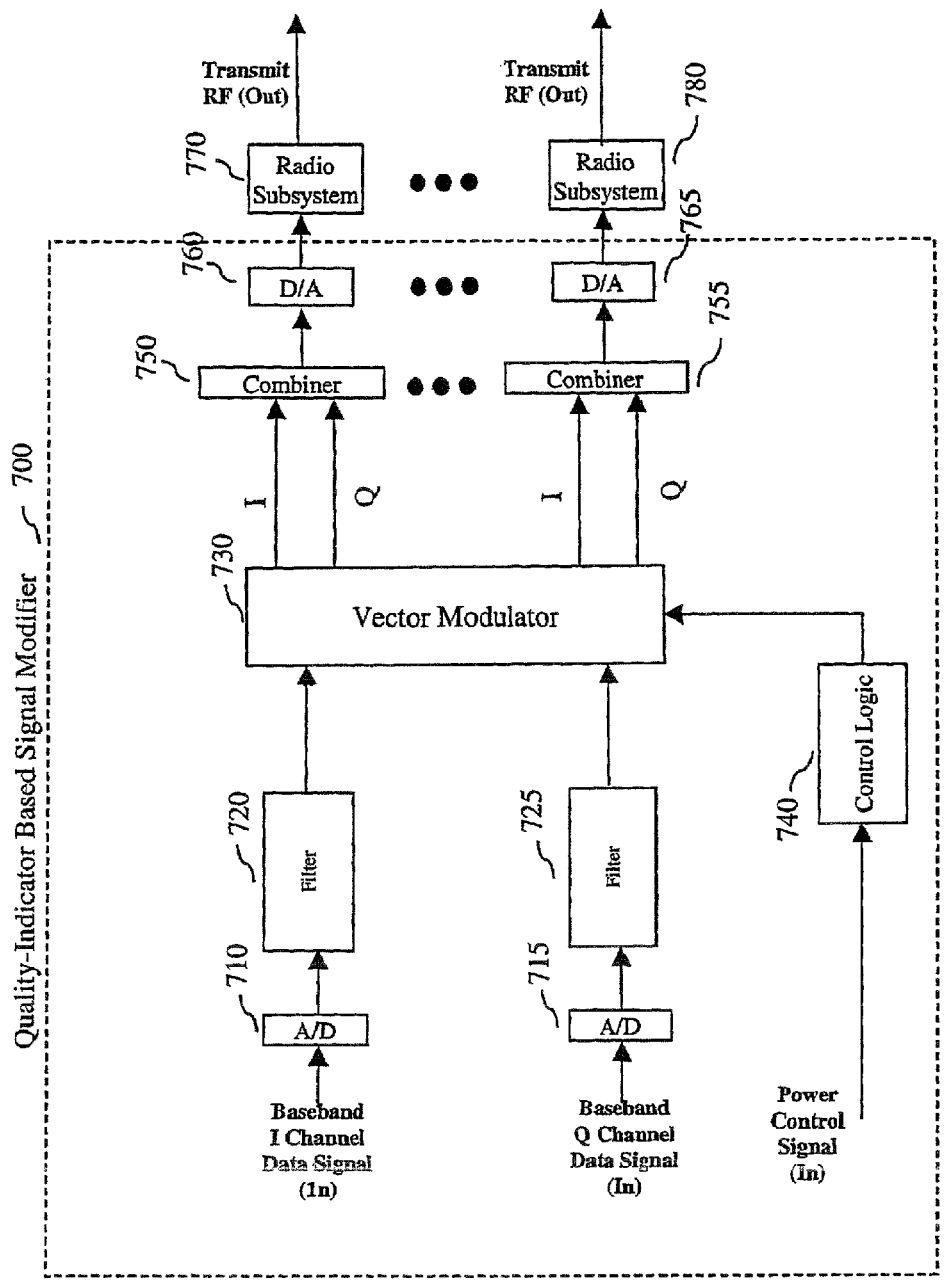
FIG. 7 shows a portion of the transmitter for the subscriber communication device according to another embodiment of the invention.

FIG. 7 shows a portion of the transmitter for the subscriber communication device according to another embodiment of the invention. The transmitter portion shown in FIG. 7 receives analog baseband signals (labeled in FIG. 7 as "Baseband I Channel Data Signal (In)" and "Baseband Q Channel Data Signal (In)") into a quality-indicator signal modifier 700.

Quality-indicator based signal modifier 700 includes A/D converters 710 and 715, filters 720 and 725, vector modulator 730, control logic 740, combiners 750 and 755, and D/A converters 760 and 765. D/A converters 760 and 765 of quality-indicator signal modifier 700 are coupled to radio subsystem 770 and 780, respectively.

A/D converter 710 receives the baseband in-phase signal. A/D converter 715 receives the baseband quadrature pre-transmission signal. A/D converters 710 and 715 are coupled to filters 720 and 725, respectively, which are in turn coupled to vector modulator 730. Control logic 740 receives the power-control signal and forwards complex weighting values to modulator 730. Vector modulator 730 is coupled to combiners 750 through 755.

Combiner 755, D/A converter 760 and radio subsystem 770 uniquely correspond to a given antenna element from the set of antenna elements for the subscriber communication device (not shown in FIG. 7). This set of components is also present corresponding to the number of antenna elements for the subscriber communication device. Consequently, combiner 755, D/A converter 765 and radio subsystem 780 are also shown corresponding to a different antenna element from the set of antenna elements. Any number of additional sets of components can be present corresponding to the number of antenna elements.

Figure 8:
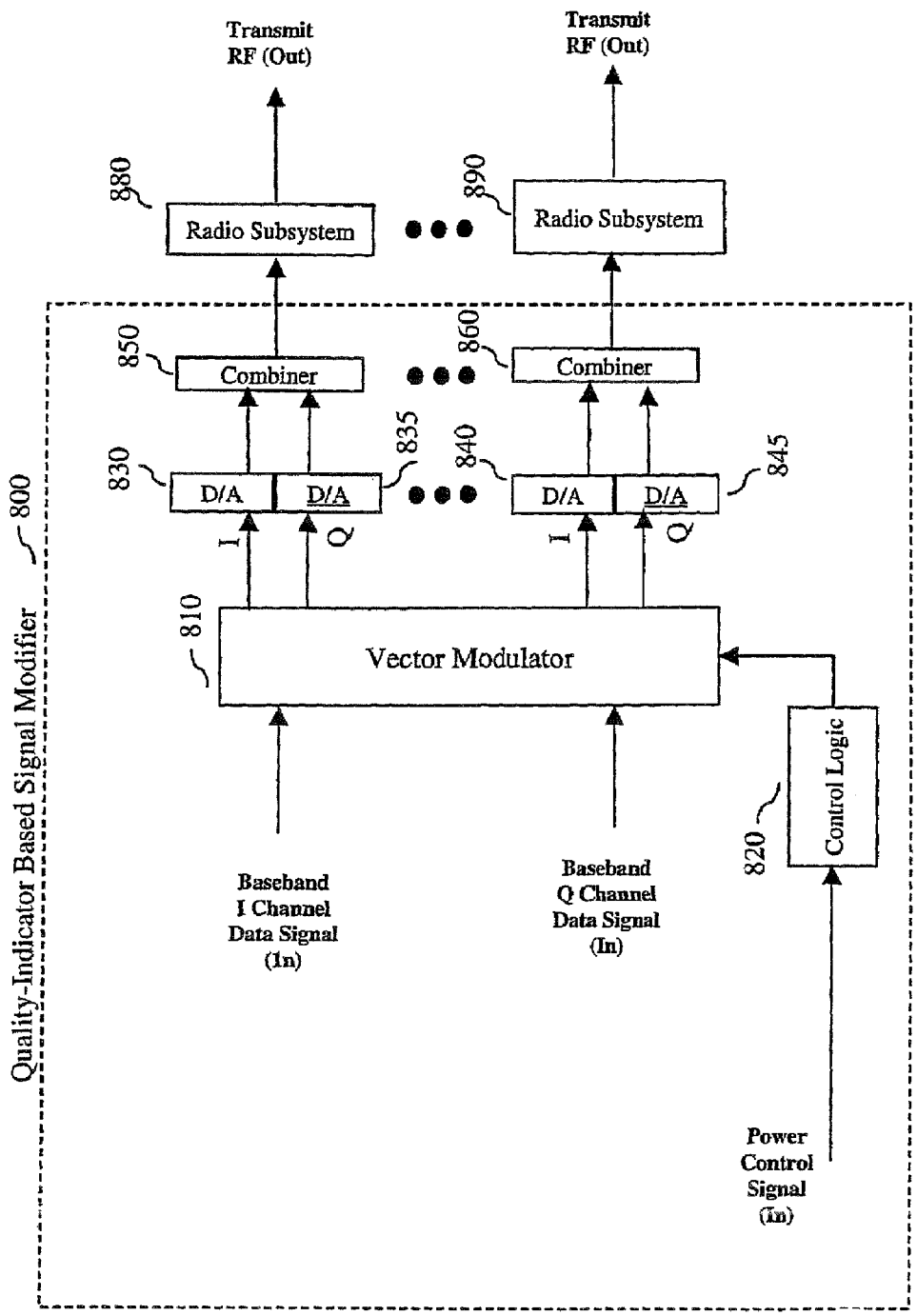
FIG. 8 shows a transmitted portion of a subscriber communication device according to yet another embodiment of the invention.

FIG. 8 shows a transmitter portion of a subscriber communication device according to yet another embodiment of the invention. More specifically, FIG. 8 shows a quality-indicator signal modifier that receives baseband digital signals.

Quality-indicator based signal modifier 800 includes vector modulator 810, control logic 802, D/A converters 830, 835, 840 and 845, and combiners 850 and 860. Combiners 850 and 860 of quality-indicator based signal modifier 800 are coupled to radio subsystems 870 and 880, respectively.

Control logic 820 receives a power-control signal and produces complex weighting values, which are provided to vector modulator 810. Vector modulator 810 also receives a digital baseband in-phase pre-transmission signal and a digital baseband quadrature pre-transmission signal. Vector modulator 810 splits the in-phase and quadrature pre-transmission signal components into a number of signals that correspond to the number of antenna elements for the subscriber communication device. The complex weighting values are then applied to the in-phase and quadrature pre-transmission signal associated for each antenna element from the set of antenna elements for the subscriber communication device to produce modified pre-transmission signals. These modified pre-transmission signals are then provided to D/A converters 830 through 845, which convert the digital form of the modified pre-transmission signals into analog form and forward these pre-transmission signals to combiners 850 and 860, respectively. Combiner 850 receives the in-phase and quadrature components of the modified pre-transmission signals from D/A converters 830 and 835, respectively. Combiner 850 adds these two signals and forwards the added signal to radio subsystem 870. Similarly, combiner 860 receives the analog in-phase and quadrature signal components of the modified pre-transmission signals from D/A converters 840 and 850, respectively and adds the signals. Combiner 860 adds these two signals and forwards the added signals to radio subsystem 880.

Figure 9:
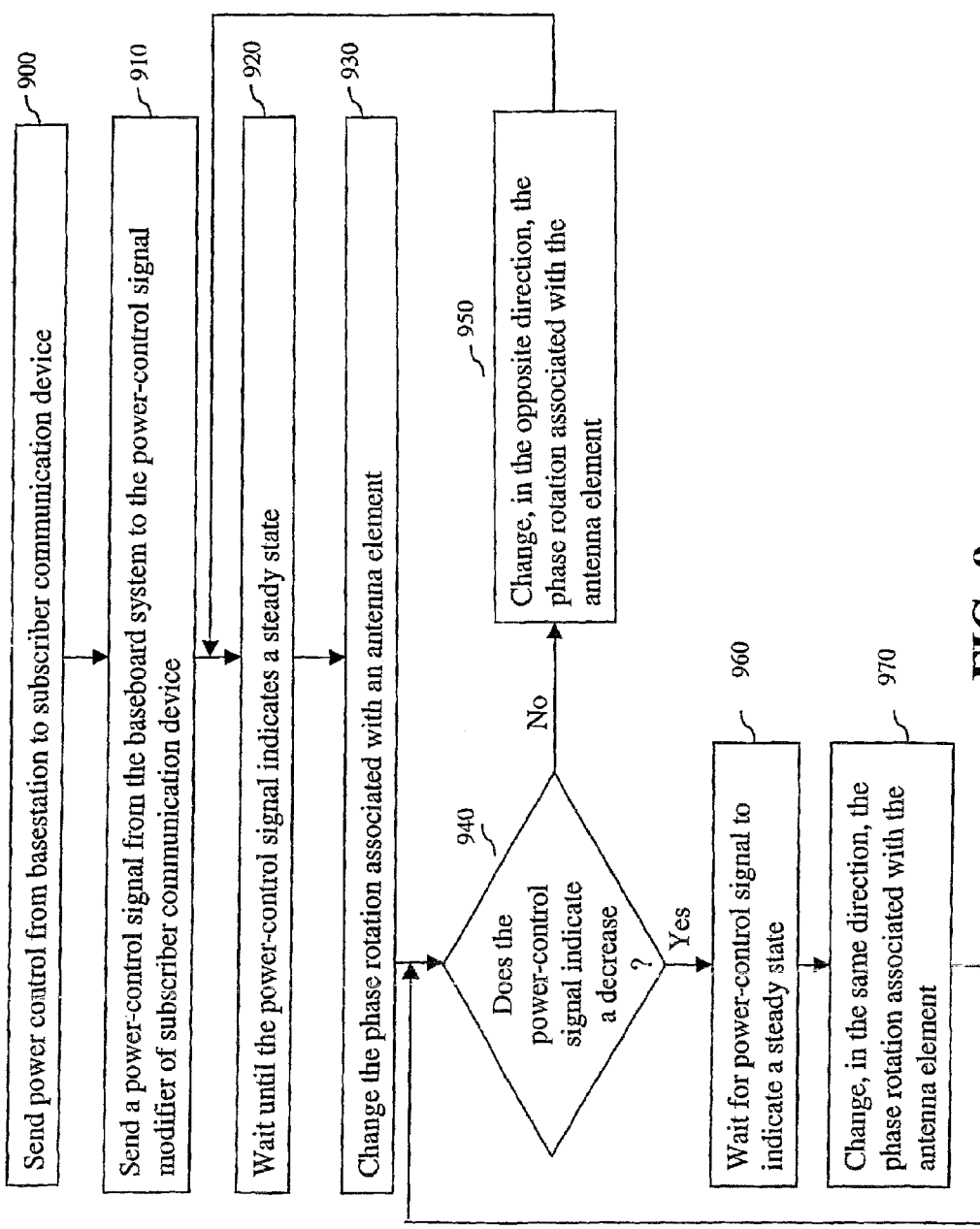
FIG. 9 shows a flowchart for calculating the complex weighting by adjusting the phase rotation associated with each antenna element, according to one embodiment.

FIG. 9 shows a flowchart for calculating the complex weighting by adjusting the phase rotation associated with each antenna element, according to an embodiment. Although FIG. 9 will be described in reference to FIGS. 1, 5 and 6 for convenience, the method described in reference to FIG. 9 can be used with any configuration of a subscriber communication device. In addition, although the quality-indication signal can be any appropriate type of signal that provides information to the subscriber communication device on the quality of the signal, for convenience of discussion, the quality-indication signal is assumed be to power-control signal according to the CDMA protocol.

At step 900, a power-indication signal is sent from basestation 110 to subscriber communication device 120 via wireless connection 130. At step 910, the power-control signal is sent from the baseband subsystem 121 to the quality-indicator based signal modifier 122 (also shown as quality-indicator based signal modifier 500 in FIG. 5). The power-control signal according to the CDMA protocol indicates one of two possible values for any given time period: an "up" value or a "down" value. An "up" value represents an indication from the basestation to the subscriber communication device that the subscriber communication device should increase the total power of its transmitted signal. A "down" value represents an indication from the basestation to the subscriber communication device that the subscriber communication device should decrease the total power of its transmitted signal. The particular value of the power-control signal is also referred to herein as including a power-control bit, which represents either the up or down values in binary form.

At step 920, the process is held until the power-control signal reaches a steady state. The power-control signal can reach a steady state in a number of ways. For example, a consecutive sequence of power-control signals of up-down-up or down-up-down. Once the power-control signal reaches a steady state, the process proceeds to step 930.

At step 930, the phase rotation associated with one antenna element is adjusted. Returning to FIGS. 5 and 6, control logic 502 calculates a new complex weighting so that the phase rotation for one antenna element is changed. This complex weighting is provided to the signal adjusters for that antenna element (e.g., signal adjusters 620 and 640, or signal adjusters 630 and 650). Upon receiving the complex weighting, these signal adjusters adjust the phase rotation thereby modifying the signal component sent from that antenna element and, consequently, modifying the total power of the transmitted signal.

At conditional step 940, the control logic 502 determines whether the power-control signal for a subsequent time period indicates a decrease, e.g., represented by a down value. If the power-control signal indicates a decrease, then the adjustment to the phase rotation for the one antenna element resulted in the basestation receiving the transmitted signal more optimally. In other words, because the basestation received the transmitted signal with increased total power, the basestation will send a down indication in a subsequent power-control signal. The subscriber communication device can continue to attempt to optimize the phase rotation for that antenna element and simultaneously reduce the total power of the transmitted signal. The total power of the transmitted signal can be reduced because the subscriber communication device is communicating with the basestation in a more optimal manner.

At conditional step 940, if the power-control signal does not indicate a decrease for the total power of the transmitted signal (e.g., the power-control signal indicates an up value), then the phase rotation adjustment was not effective and the process proceeds to step 950. At step 950, logic control 502 changes the phase rotation associated with that antenna element to the opposite direction. Then, the process proceeds to step 920 where steps 920 through 940 are repeated based on the opposite direction for the phase rotation.

At conditional step 940, if the power-control signal indicates a decrease for the total power of the transmitted signal (e.g., the power-control signal indicates a down value), then the phase rotation adjustment was effective and the process proceeds to step 960. At step 960, the process is held until the power-control signal reaches a steady state. At step 970, logic control 502 changes the phase rotation associated with that antenna element to the same direction. Then, the process proceeds to step 920 where steps 920 through 940 are repeated based on the same direction for the phase rotation.

Figure 10:
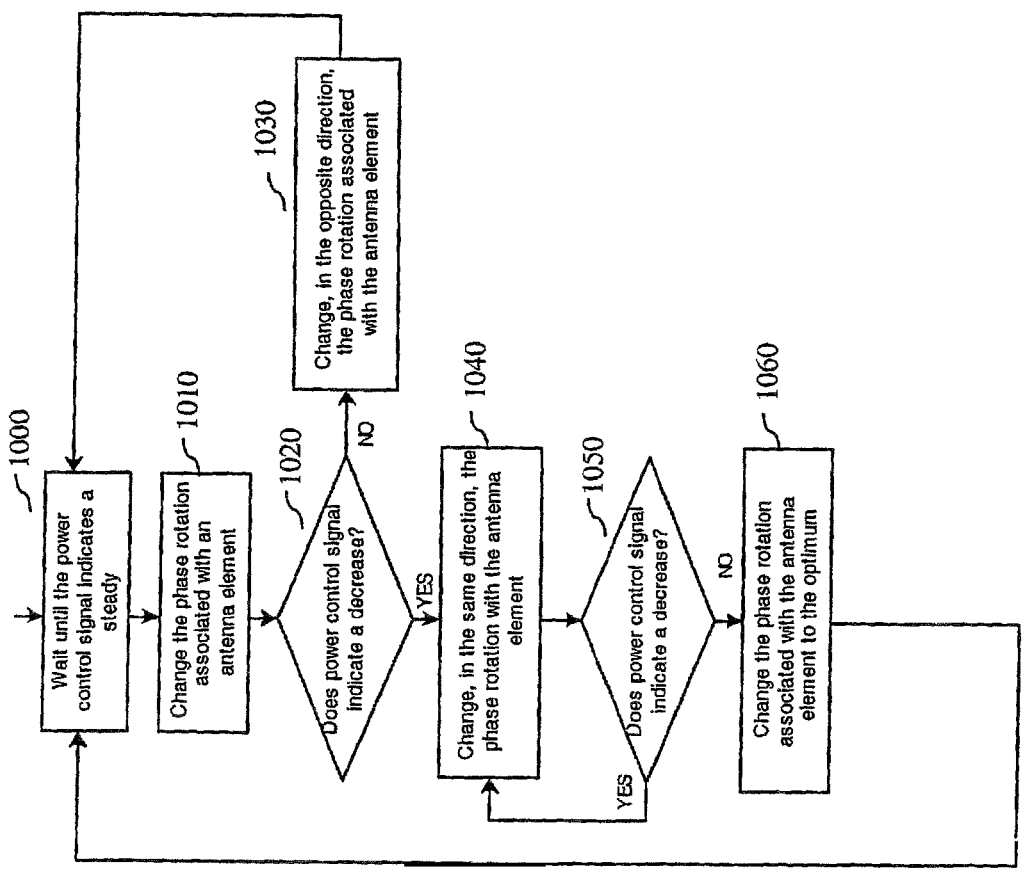
FIG. 10 shows a flowchart for calculating the complex weighting by adjusting the phase rotation associated with each antenna element, according to another embodiment.

FIG. 10 shows a flowchart for calculating the complex weighting by adjusting the phase rotation associated with each antenna element, according to yet another embodiment. At step 1000, the process is held until the power-control signal reaches a steady state. Once the power-control signal reaches a steady state, the process proceeds to step 1010. At step 1010, the phase rotation associated with one antenna element is adjusted based of a new complex weighting calculated by control logic 502.

At conditional step 1020, the control logic 502 determines whether the power-control signal for a subsequent time period indicated a decrease for the total power of the transmitted power, e.g., represented by a down value. If the power-control signal indicates a decrease, then the adjustment to the phase rotation for the one antenna element resulted in the basestation receiving the transmitted signal more optimally. Consequently, the selected direction for the phase rotation is correct and further adjustments to the phase rotation in the same direction may result in a further optimized transmitted signal.

At conditional step 1020, if the power-control signal does not indicate a decrease for the total power of the transmitted signal (e.g., the power-control signal indicates an up value), then the phase rotation adjustment was not effective and the process proceeds to step 1030. At step 1030, logic control 502 changes the phase rotation associated with that antenna element to the opposite direction. Then, the process proceeds to step 1000 where steps 1000 through 1020 are repeated based on the opposite direction for the phase rotation.

At step 1040, logic control 502 changes the phase rotation associated with that antenna element in the same direction. At conditional step 1050, the control logic 502 determines whether the power-control signal for a subsequent time period indicated a decrease, e.g., represented by a down value. If the power-control signal indicates a decrease, then the adjustment to the phase rotation was effective and again process proceeds to 1040. Steps 1040 and 1050 are repeated until the control logic 502 determines that the power-control signal for a subsequent time period indicates an increase for the total power of the transmitted power. At this point, the optimum phase rotation can be obtained by taking the average of the phase rotations during step 1040 and the process proceeds to step 1060. At step 1060, the phase rotation for the antenna element is returned to the previous optimal phase rotation value. Then, the process proceeds to step 1000 where the process is repeated for another antenna element. In this manner, the process can be repeated for each antenna element to obtain an overall optimum for the multiple antenna elements.

Figure 11:
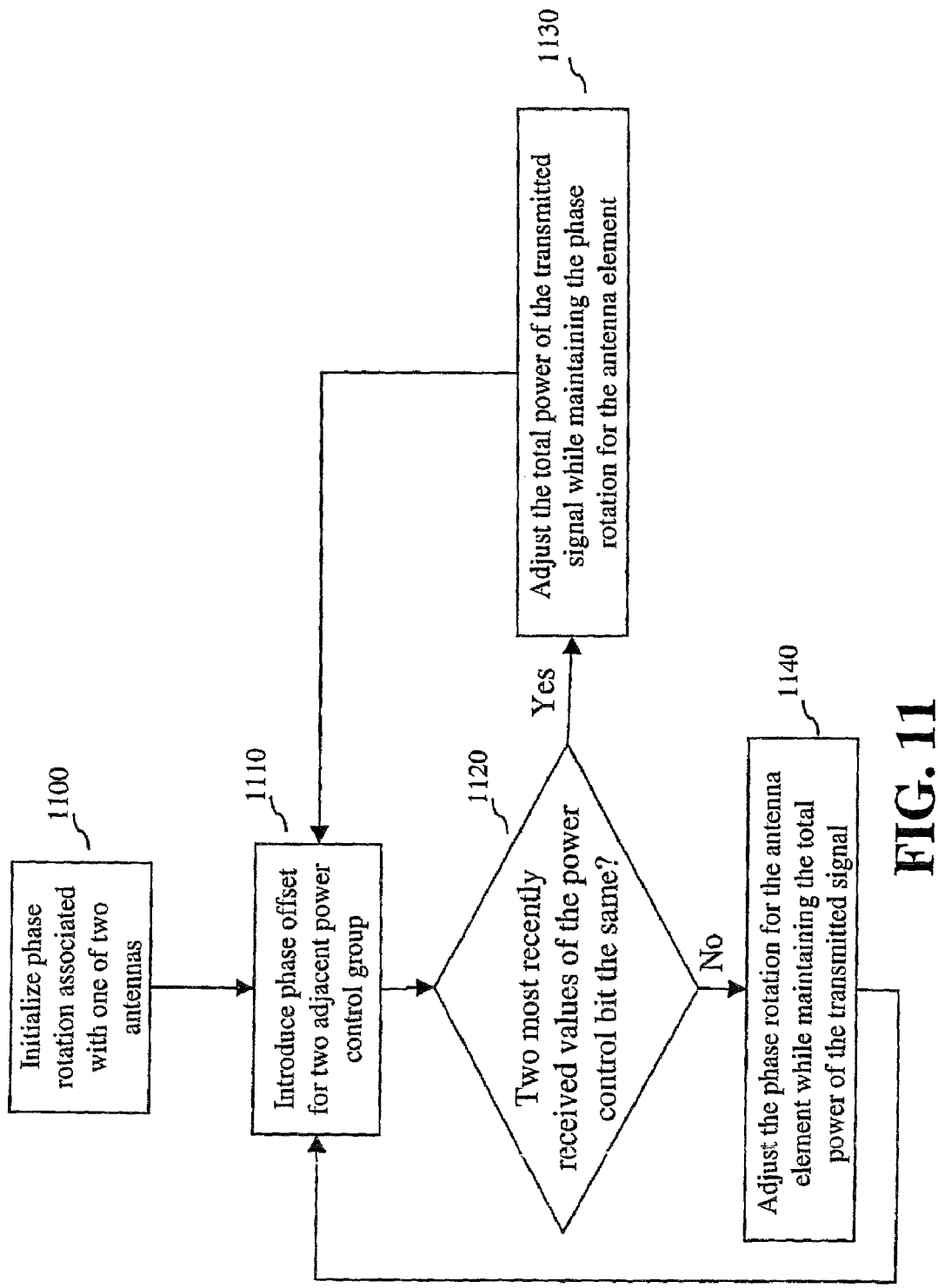
FIG. 11 shows a flowchart for calculating the complex weighting by adjusting the phase rotation associated with each antenna element, according to yet another embodiment.

FIG. 11 shows a flowchart for calculating the complex weighting by adjusting the phase rotation associated with each antenna element, according to another embodiment. FIG. 11 describes a method where the two most recently received values for the power-control bits are used to determine the proper phase rotation, and consequently, the proper complex weighting.

In this embodiment, the subscriber communication device using the CDMA protocol sends a signal of two adjacent power control groups (PCGs) in such a manner that the power associated with both PCGs are at the same level P. To simplify this discussion, assume for this embodiment that the subscriber communication device has two antenna elements, although any number of multiple antenna elements is possible. The phase rotation of the second antenna element relative to the first antenna element in the fast PCG is Phi. The phase rotation of the second antenna element relative to the first antenna element in the second PCG is Phi+Delta.

The phase rotation offset (referred to as "Delta") introduced between the first and second PCG provides a mechanism to determine the direction of the phase rotation between the two antenna elements that will improve the signal quality received at the basestation. Consequently, the complex weighting can be calculated by the following: if the value of the power-control bit for the most recent time period corresponds to the value of the power-control bit for the second most recent time period, the total power of the transmitted signal is adjusted while maintaining the phase rotation of the two antenna elements (i.e., maintaining Phi); if the value of the power-control bit for the most recent time period differs from the value of the power-control bit for the second time period, phase rotation of the-two elements (i.e., Phi) is adjusted while maintaining the total power of the transmitted signal. The following more fully discusses this embodiment.

At step 1100, a phase rotation associated with one of the two antenna elements is initialized. At step 1110, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1120, a determination is made as to whether the two most recently received values for the power-control bit are same. In other words, the power-control bit will have a particular value for each time period. For example, this time period for the CDMA and the WCDMA protocols is 1.25 msec and 666 μsec, respectively. The determination at step 1120 compares the value for the power-control bit at the most recent time period to the value for the power-control bit at the second most recent time period. If the two values for the power-control bit correspond, the process proceeds to step 1130. If the two values for the power-control bit differ, the process proceeds to step 1140.

At step 1130, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Then, the process proceeds to step 1110 so that the process is repeated.

At step 1140, the phase rotation for the two antenna elements is adjusted while maintaining total power of the transmitted signal. Control logic 502 adjusts the phase rotation for the antenna and maintains the total power of the transmitted signal by appropriately calculating new complex weighting. Then, the process proceeds to step 1110 so that the process is repeated.

In this manner, the two most recently received values for the power-control bits are used to determine the proper phase rotation, and consequently, a proper complex weighting. Although the total power of the transmitted signal is adjusted according to this embodiment, the power ratios of the respective antenna elements are not adjusted. The embodiments discussed below in connection with FIGS. 12 and 13 address the calculation of complex weighting so that the total power of the transmitted signal, the phase rotation and the power ratio of the antenna elements are adjusted.

Figure 12:
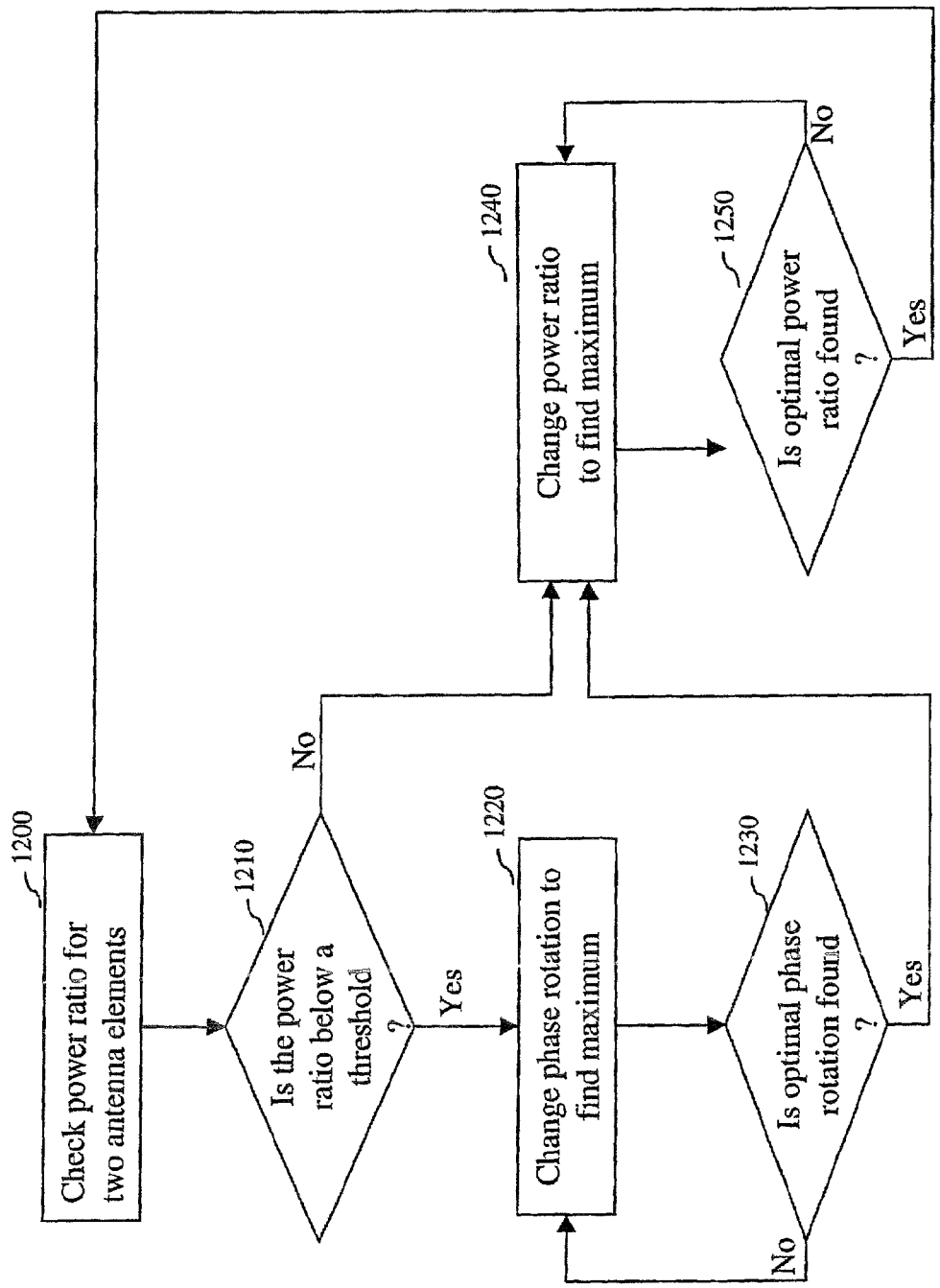
FIG. 12 shows a flowchart for calculating the complex weighting by adjusting the power ratio and the phase rotation associated with each antenna element, according to an embodiment of the invention.

FIG. 12 shows a flowchart for calculating the complex weighting by adjusting the power ratio and the phase rotation associated with each antenna element, according to an embodiment of the invention. In this embodiment, an element threshold detection is considered before adjusting any phase rotation or power ratio for the antenna elements. Again, to simplify this discussion, assume for this embodiment that the subscriber communication device has two antenna elements, although any number of multiple antenna elements is possible. By checking the ratio of the antenna elements, the basestation can provide feedback using the power-control bit of the power-control signal.

More specifically, based on the threshold values, the phase rotation can be adjusted to converge on a substantially optimal phase rotation value. Having determined the substantially optimal phase rotation value, the power ratio value for the antenna elements can be calculated until a substantially optimal power ratio value is converged upon. The process is iterative and can be interrupted at any time to change any parameter, such as the phase rotation or the power ratio.

At step 1200, the power ratio for the two antenna elements is measured. At conditional step 1210, a determination is made as to whether the power ratio is below a predetermined threshold. If the power ratio is not below the predetermined threshold, then the process proceeds to step 1240. If the power ratio is below the predetermined threshold, then the process proceeds to step 1220 to tune the phase rotation.

At step 1220, the phase rotation is changed to find a maximum value. At conditional step 1230, the phase rotation is checked to determine whether it is a substantially optimal value. If the phase rotation is not a substantially optimal value, the process proceeds to step 1220 where the process for finding a substantially optimal value of the phase rotation continues. If the phase rotation is a substantially optimal value, then the process proceeds to step 1240.

At step 1240, the power ratio is changed to find a maximum value. At conditional step 1250, the power ratio is checked to determine whether it is a substantially optimal value. If the power ratio is not a substantially optimal value, the process proceeds to step 1240 where the process for finding a substantially optimal value of the power ratio continues. If the power ratio is a substantially optimal value, then the process proceeds to step 1200, where the overall process repeats.

In sum, the complex weighting can be calculated by adjusting the phase rotation associated with the antenna elements first, and then adjusting the power ratio associated with the antenna elements. In this manner, both the phase rotation and the power ratio can be adjusted to optimize substantially the transmitted signal sent from the subscriber communication device at received at the basestation.

Figure 13:
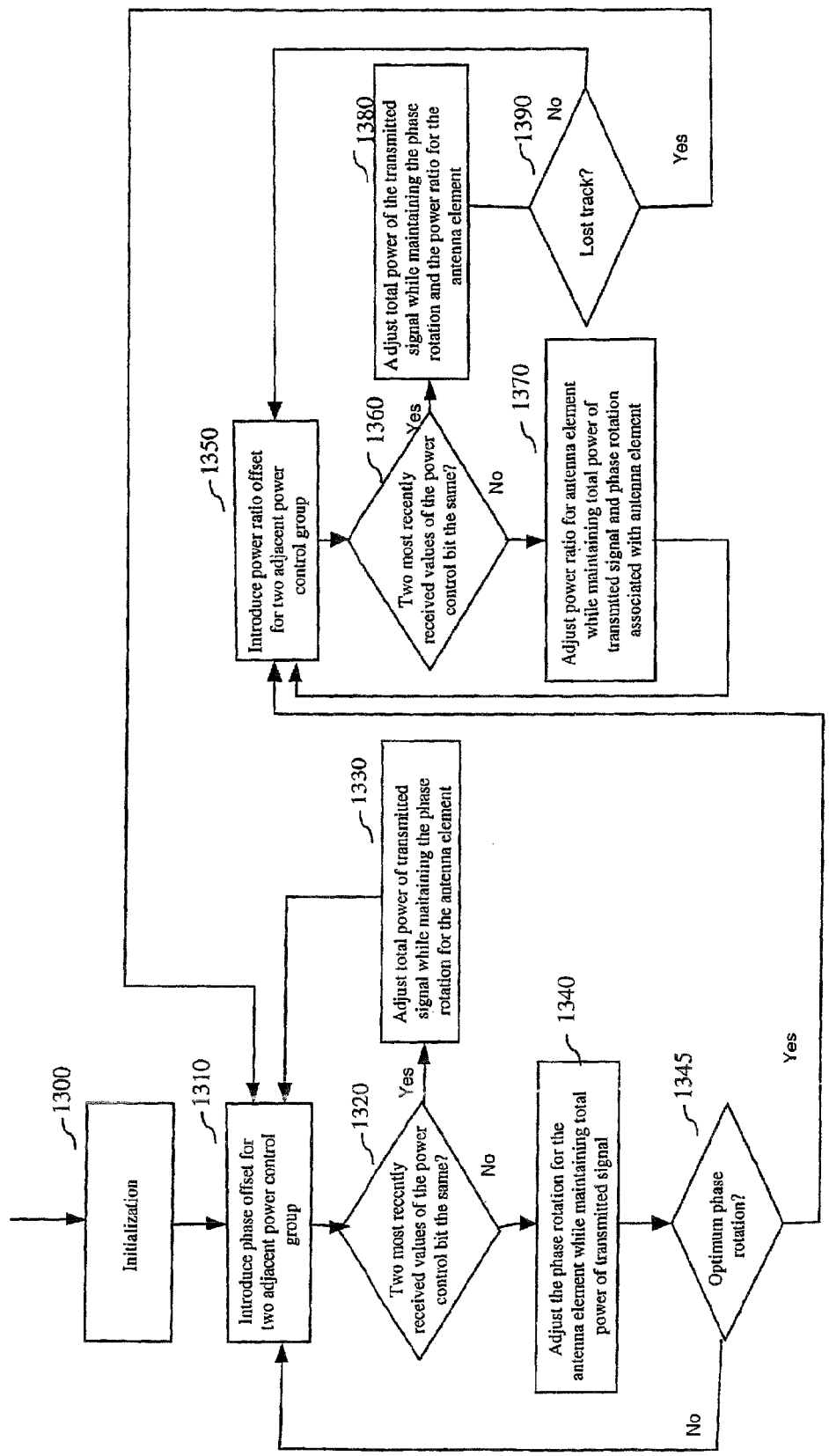
FIG. 13 shows a flowchart for calculating the complex weighting by adjusting the power ratio and the phase rotation associated with each antenna element, according to another embodiment of the invention.

FIG. 13 shows a flowchart for calculating the complex weighting by adjusting the power ratio and the phase rotation associated with each antenna element, according to another embodiment of the invention. Similar to FIG. 11, FIG. 13 describes a method where the two most recently received values for the power-control bit are used to determine the proper phase rotation. In FIG. 13, however, the power ratio associated with the two antenna elements is adjusted after the phase rotation associated with the second antenna element is adjusted. The process of adjusting the power ratio is similar to that described above for adjusting the phase rotation in reference to FIG. 11.

In this embodiment, the subscriber communication device using the CDMA protocol sends a signal of two adjacent power control groups (PCGs) in such a manner that the power associated with both PCGs are at the same level P. Again, to simplify this discussion, assume for this embodiment that the subscriber communication device has two antenna elements, although any number of multiple antenna elements is possible.

The power ratio associated with the first PCG between the first antenna element and the second antenna element is Lambda. The power ratio associated with the second PCG between the first antenna element and the second antenna element is Lambda+Zeta. The power ratio offset (i.e., Zeta) introduced between the first and second PCG provides a mechanism to determine the direction of changing power ration between the two antenna elements that will improve the signal quality received at the basestation. Consequently, the complex weighting can be calculated by the following: if the value of the power-control bit for the most recently received time period corresponds to the value of the power-control bit for the second most recently received time period, the total power of the transmitted signal is adjusted while maintaining the power ratio of the two antenna elements; if the value of the power-control bit for the most recently received time period differs from the value of the power-control bit for the second most recently received time period, power ratio Lambda is adjusting while maintaining the total power of the transmitted signal. The following more fully discusses this embodiment.

At step 1300, a phase rotation and a power ratio associated with one of the two antenna elements is initialized. At step 1310, phase rotation offset (also referred to above as Delta) is introduced for two adjacent PCGs. Based on this introduced phase rotation offset, a transmitted signal is sent from the subscriber communication device to the basestation. Then, the basestation sends a power-control signal based on this received transmitted signal.

At conditional step 1320, a determination is made as to whether the two most recently received values for the power-control bit are same. If the two values for the power-control bits correspond, the process proceeds to step 1330. If the two values for the power-control bits differ, the process proceeds to step 1340.

At step 1330, the total power of the transmitted signal is adjusted while maintaining the phase rotation for the antenna element. Control logic 502 adjusts the total power of the transmitted signal and maintains the phase rotation for the two antenna elements by appropriately calculating new complex weighting. Note that during this step the power ratio for the two antenna elements are also maintained. Then, the process proceeds to step 1310 so that the process is repeated.

At step 1340, the phase rotation for the two antenna elements is adjusted while maintaining total power of the transmitted signal. Control logic 502 adjusts the phase rotation for the antenna and maintains the total power of the transmitted signal by appropriately calculating new complex weighting. Note that during this step the power ratio for the two antenna elements are also maintained. Then, the process proceeds to conditional step 1345.

At conditional step 1345, a determination is made as to whether the adjusted phase rotation produced by step 1340 is optimal. If the phase rotation is less than substantially optimal, then the process proceeds to step 1310. If the phase rotation is substantially optimal, then the process proceeds to step 1350.

At step 1350, power ratio offset (also referred to above as Zeta) is introduced for two adjacent PCGs. At conditional step 1350, a determination is made as to whether the two most recently received values for the power-control bit correspond. If the two most recently received values for the power-control bit correspond, the process proceeds to step 1380. If the two most recently received values for the power-control bit differ, the process proceeds to step 1370.

At step 1370, the power ratio for the antenna element is adjusted while maintaining total power of the transmitted signal and maintaining the phase rotation for the two antenna elements. Control logic 502 adjusts the power ratio for the antenna and maintains the total power of the transmitted signal and the phase rotation for two antenna elements by appropriately calculating new complex weighting. The process then proceeds to step 1350 so that steps 1350 and 1360 are repeated until the two values for the most recently received values for the power-control bit correspond.

At step 1380, the power of the transmitted signal is adjusted while maintaining the power ratio and the phase rotation for the antenna element. Control logic 502 adjusts the total power of the transmitted signal and maintains the power ratio and the phase rotation for the antenna element by appropriately calculating new complex weighting. At conditional step 1390, a determination is made as to whether the track is lost. If the track is not lost, then the process proceeds to step 1350 so that the process of tuning the power ratio associated with the antenna element and the total power of the transmitted signal are repeated in steps 1350 through 1390.

Returning to conditional step 1390, if the track is lost, then the process proceeds to step 1310 where the process of optimizing the phase rotation and then the power ratio is repeated in steps 1310 through 1390.

CONCLUSION

While various embodiments of the invention have been described above, it should be understood that they have been presented by way of example only, and not limitation. Thus, the breadth and scope of the invention should not be limited by any of the above-described embodiments, but should be defined only in accordance with the following claims and their equivalents.

The previous description of the embodiments is provided to enable any person skilled in the art to make or use the invention. While the invention has been particularly shown and described with reference to embodiments thereof, it will be understood by those skilled in the art that various changes in form and details may be made therein without departing from the spirit and scope of the invention. For example, although the previous description of the embodiments often referred to communication devices using a CDMA protocol, other types of protocols are possible. For example, the communication devices similar to those described above can be used with time-division multiple access (TDMA) or frequency-division multiple access (FDMA) protocols. Such a TDMA protocol can include, for example, the Global Systems for Mobile Communications (GSM) protocol.

Note that although the tuning of a communication device is described through the use complex weighting, in other embodiments other types of control signals can tune the communication device. In other words, the tuning of a communication device through the use such control signals need not be limited to information about varying the magnitude and phase of the signal. For example, the control signals can carry information to vary the magnitude, phase, frequency and/or timing of the signal associated with each antenna element.

What is claimed is:

1. A method for a first communication device to communicate with a second communication device over a communication link, the first communication device having a plurality of antenna elements, the method comprising:
    receiving a power control signal from the second communication device representative of the signal power received at the second communication device, wherein the power control signal is a power-up signal or a power-down signal;
    receiving a data signal for transmission;
    generating a pre-transmission signal for each antenna element from the data signal;
    if a pre-determined sequence of power control signals is received indicating that the signal power received at the second communication device is substantially in a steady state, adjusting either one or both of a relative phase rotation and a power ratio of the pre-transmission signals, wherein the pre-determined sequence of power control signals includes a consecutive sequence of at least one power-up and one power-down signal; and
    transmitting each of the adjusted pre-transmission signals from the plurality of antenna elements.

2. A method according to claim 1, wherein the pre-determined sequence is a consecutive sequence of up-down-up or down-up-down.

3. A method according to claim 1, further comprising:
    if after adjusting the relative phase rotation a power control signal is received indicating power-up, adjusting the relative phase rotation of the pre-transmission signals in the opposite relative direction as previously adjusted.

4. A method according to claim 1, further comprising:
    if after adjusting the relative phase rotation a power control signal is received indicating power-down, adjusting the signal power until a pre-determined sequence of power control signals is received indicating that the signal power received at the second communication device is again substantially in a steady state; and
    adjusting the relative phase rotation of the pre-transmission signals in the same relative direction as previously adjusted.

5. A method according to claim 1, further comprising:
    if after adjusting the relative phase rotation a power control signal is received indicating power-down, repeatedly adjusting the relative phase rotation of the pre-transmission signals in the same relative direction as previously adjusted until a power control signal is received indicating power-up.

6. A method according to claim 5, further comprising:
    calculating an average relative phase rotation for a period while power control signals were received indicating power-down; and
    adjusting the relative phase rotation to equal said average.

7. A method according to claim 1, further comprising storing said pre-determined sequence of power control signals.

8. A method according to claim 1, further comprising:
adjusting the total power of the transmitted signal while adjusting the relative phase rotation.

9. A method according to claim 1, further comprising adjusting the power ratio of the pre-transmission signals when the relative phase rotation is substantially optimal.

10. A method according to claim 1, further comprising:
determining if the power ratio is below a threshold;
if the power ratio is below the threshold, adjusting the relative phase rotation; and
if the power ratio is above the threshold, adjusting the power ratio.

11. A method according to claim 1, further comprising:
transmitting first and second adjusted pre-transmission signals, wherein a phase offset is introduced between the first and second adjusted pre-transmission signals;
receiving a first and second power control signal for each respective transmitted adjusted pre-transmission signal; and
if said power control signals are different, adjusting said relative phase rotation.

12. A method according to claim 1, further comprising:
transmitting first and second adjusted pre-transmission signals, wherein a power ratio offset is introduced between the first and second adjusted pre-transmission signals;
receiving a first and second power control signal for each respective transmitted adjusted pre-transmission signal; and
if said power control signals are different, adjusting said power ratio.

13. A method according to claim 11, wherein if said power control signals are the same the total power of the transmitted signals is adjusted.

14. A method according to claim 11, wherein said first and second adjusted pre-transmission signals are transmitted as power control groups.

15. A method according to claim 1, wherein:
said power control signal is a quality-indication signal;
a complex weighting is calculated based on the quality-indication signal;
in the adjusting step, each pre-transmission signal is modified based on the complex weighting, each modified pre-transmission signal being uniquely associated with a respective antenna from the plurality of antenna elements; and
in the transmitting step, each of the modified pre-transmission signals is sent from the plurality of antenna elements to produce an effective combined transmitted signal, the complex weighting being associated with a total power of the transmitted signal, the complex weighting adjusting either one or both of the phase rotation and the power ratio for each modified pre-transmission signal associated with each antenna element from the plurality of antenna elements.

16. The method of claim 15, wherein:
the total power of the transmitted signal is controlled with respect to a rate of fading associated with a channel between the first communication device and the second communication device.

17. The method of claim 15, wherein:
the communication link is configured according to at least one Code-Division-Multiple-Access (CDMA) protocol from the group of CDMA-IS-95 A/B, CDMA 2000 1X/RTT, CDMA 2000 3X, CDMA EV-DO, WCDMA, 3G Universal Mobile Telecommunications System (UMTS) and 4G UMTS.

18. The method of claim 17, wherein:
the quality-indication signal is a power-control bit according to the CDMA protocol, the power-control bit having a value of one or zero for each time period from a plurality of time periods, the power-control bit being generated by the second communication device and indicating an adjustment to a power of the transmitted signal at the first communication device so that a predetermined threshold requirement for the second communication device can be satisfied.

19. The method of claim 18, wherein:
the complex weighting is associated with the total power of the transmitted signal and the phase rotation associated with each antenna element from the plurality of antenna elements.

20. The method of claim 19, wherein the calculating of the complex weighting includes:
substantially optimizing the total power of the transmitted signal and the phase rotation associated with each antenna element from the plurality of antenna elements in parallel while maintaining a power ratio associated with each antenna element from the plurality of antenna elements.

21. The method of claim 1, wherein:
the first communication device is a subscriber communication device; and
the second communication device is a base station.

22. The method of claim 1, wherein:
the first communication device is a base station; and
the second communication device is a subscriber communication device.

23. The method of claim 15, wherein:
the communication link is configured according to at least one Time Division Multiple Access (TDMA) protocol or at least one frequency division multiple access (FDMA) protocol.

24. The method of claim 15, wherein modifying the pre-transmission signal includes dividing the pre-transmission signal for each antenna element into a first signal component and a second signal component;
adjusting at least one characteristic associated with at least one from the group of the first signal component and the second signal component based on the quality-indication signal, the at least one characteristic being from the group of a power ratio and a phase rotation; and
combining the first signal component and the second signal component to produce a transmit signal component uniquely associated with an antenna element from the plurality of antenna elements, the transmit signal component for each antenna element from the plurality of antenna elements being a low-correlation version of the pre-transmission signal.

25. The method of claim 15 further comprising:
receiving a plurality of quality-indication signals from a second communication device, the first communication device comprising a plurality of antenna elements;
calculating a complex weighting according to the plurality of quality-indication signals;
wherein modifying each pre-transmission signal includes modulating at least a subset of a plurality of pre-transmission signals in accordance with the complex weighting, the subset of pre-transmission signals being modulated by adjusting at least one signal parameter of a plurality of signal parameters wherein the complex weighting is associated with an optimization of the combined transmitted signal.

26. The method of claim 25, wherein the optimization of the combined transmitted signal further comprises minimizing a total power of the combined transmitted signal.

27. A first communication device having a plurality of antenna elements, comprising:
means for generating a pre-transmission signal for each antenna element; and
a control logic component for receiving a power control signal from a second communication device representative of the signal power received at the second communication device, and, if a pre-determined sequence of power control signals is received indicating that the signal power received at the second communication device is substantially in a steady state, for adjusting either one or both of a relative phase rotation and a power ratio of the pre-transmission signals, wherein the power control signal is a power-up signal or a power-down signal, and wherein the pre-determined sequence of power control signals includes a consecutive sequence of at least one power-up and one power-down signal.

28. A first communication device according to claim 27, wherein the pre-determined sequence is a consecutive sequence of up-down-up or down-up-down.

29. A first communication device according to claim 27, wherein the control logic component is adapted such that if, after adjusting the relative phase rotation, a power control signal is received indicating power-up, the relative phase rotation of the pre-transmission signals is adjusted in the opposite relative direction as previously adjusted.

30. A first communication device according to claim 27, wherein the control logic component is adapted such that if, after adjusting the relative phase rotation, a power control signal is received indicating power-down, the signal power is adjusted until a pre-determined sequence of power control signals is received indicating that the signal power received at the second communication device is again substantially in a steady state; and
means for adjusting the relative phase rotation of the pre-transmission signals in the same relative direction as previously adjusted.

31. A first communication device according to claim 27, wherein the control logic component is adapted such that if, after adjusting the relative phase rotation, a power control signal is received indicating power-down, the relative phase rotation of the pre-transmission signals is repeatedly adjusted in the same relative direction as previously adjusted until a power control signal is received indicating power-up.

32. A first communication device according to claim 31, further comprising:
means for calculating an average relative phase rotation for a period while power control signals were received indicating power-down; and
means for adjusting the relative phase rotation to equal said average.

33. A first communication device according to claim 27, further comprising means for storing said pre-determined sequence of power control signals.

34. A first communication device according to claim 27, further comprising:
means for adjusting the total power of the transmitted signal while adjusting the relative phase rotation.

35. A first communication device according to claim 27, further comprising means for adjusting the relative power of the pre-transmission signals when the relative phase rotation is substantially optimal.

36. A first communication device according to claim 27, further comprising means for determining if the power ratio is below a threshold, and wherein the control logic component is adapted such that, if the power ratio is below the threshold, the relative phase rotation is adjusted and such that, if the power ratio is above the threshold, the power ratio is adjusted.

37. A first communication device according to claim 27, further comprising:
means for transmitting first and second adjusted pre-transmission signals, wherein a phase offset is introduced between the first and second adjusted pre-transmission signals; and
means for receiving a first and second power control signal for each respective transmitted adjusted pre-transmission signal;
wherein said control logic component is adapted such that, if said power control signals are different, said relative phase rotation is adjusted.

38. A first communication device according to claim 27, further comprising:
means for transmitting first and second adjusted pre-transmission signals, wherein a power ratio offset is introduced between the first and second adjusted pre-transmission signals; and
means for receiving a first and second power control signal for each respective transmitted adjusted pre-transmission signal;
wherein said control logic component is adapted such that, if said power control signals are different, said power ratio is adjusted.

39. A first communication device according to claim 37, wherein said control logic component is adapted such that, if said power control signals are the same, the total power of the transmitted signals is adjusted.

40. A first communication device according to claim 37, wherein said first and second adjusted pre-transmission signals are transmitted as power control groups.

41. A first communication device according to claim 27, wherein:
the control logic component is adapted to receive the power control signal in the form of a quality-indication signal and to produce a plurality of complex weights; and
the device further comprises a plurality of circuits coupled to the control-logic component, each circuit from the plurality of circuits being uniquely associated with one of the plurality of antenna elements, each circuit from the plurality of circuits producing a modified pre-transmission signal based on the plurality of complex weights, the plurality of complex weights adjusting either one or both of a phase rotation and a power ratio of each modified pre-transmission signal associated with each antenna element from the plurality of antenna elements.

42. The first communication device of claim 41, wherein:
each circuit from the plurality of circuits has:
a filter, the filter configured to receive a pre-transmission signal and produce a first pre-transmission signal component and a second pre-transmission signal component;
a first signal adjuster coupled to the filter, the first signal adjuster configured to receive the first pre-transmission signal component and a complex weight from the plurality of complex weights, the first signal adjuster configured to send a modified-pre-transmission signal based on the complex weight for the first signal adjuster; and
a second signal adjuster coupled to the filter, the second signal adjuster configured to receive the second signal component and a complex-weight signal from the plurality of complex-weight signals, the second signal adjuster configured to send a modified-pre-transmission signal based on the complex weight for the second signal adjuster.

43. The first communication device of claim 42, wherein:
each circuit from the plurality of circuits further includes:
 an analog-to-digital converter coupled to the filter; and
 a digital-to-analog converter coupled to the first signal adjuster and the second signal adjuster;
 the first signal component produced by the filter is an in-phase pre-transmission signal; and
 the second signal component produced by the filter is a quadrature pre-transmission signal.

44. The first communication device of claim 41, wherein:
the transmitted signal is sent by the first communication device based on at least one time-division multiple access (TDMA) protocol or at least one frequency-division multiple access (FDMA) protocol.

45. The first communication device of claim 41, wherein each circuit receives a pre-transmission signal associated with a data signal to be transmitted, each modified pre-transmission signal being a low-correlation version of the pre-transmission signal.

46. The first communication device of claim 45, wherein:
the control logic is operable to:
 receive a plurality of quality-indication signals from a second communication device; and
 calculate a complex weighting according to the plurality of quality-indication signals; and
 each circuit is operable to modulate at least a subset of a plurality of pre-transmission signals in accordance with the complex weighting, the subset of pre-transmission signals modulated by adjusting at least one signal parameter of a plurality of signal parameter, the complex weighting associated with an optimization of the combined transmitted signal.

* * * * *